United States Patent
Shanbhogue et al.

(10) Patent No.: US 12,038,845 B2
(45) Date of Patent: Jul. 16, 2024

(54) DEVICE, SYSTEM AND METHOD TO PROVIDE LINE LEVEL TAGGING OF DATA AT A PROCESSOR CACHE

(71) Applicant: Intel Corporation, Santa Clara, CA (US)

(72) Inventors: Vedvyas Shanbhogue, Austin, TX (US); Siddhartha Chhabra, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 783 days.

(21) Appl. No.: 17/029,913

(22) Filed: Sep. 23, 2020

(65) Prior Publication Data
US 2022/0091992 A1    Mar. 24, 2022

(51) Int. Cl.
G06F 12/00 (2006.01)
G06F 12/0895 (2016.01)

(52) U.S. Cl.
CPC .. *G06F 12/0895* (2013.01); *G06F 2212/1021* (2013.01)

(58) Field of Classification Search
CPC ......... G06F 12/0895; G06F 2212/1021; G06F 12/0811; G06F 12/0886
USPC ............................................. 711/154
See application file for complete search history.

(56) References Cited

U.S. PATENT DOCUMENTS

| | | | |
|---|---|---|---|
| 2018/0059980 A1* | 3/2018 | Takeda | G06F 3/0652 |
| 2020/0133732 A1* | 4/2020 | Kondiles | G06F 9/5077 |
| 2020/0379912 A1* | 12/2020 | Kondiles | G06F 16/24542 |

* cited by examiner

*Primary Examiner* — Mardochee Chery
(74) *Attorney, Agent, or Firm* — Essential Patents Group, LLP

(57) ABSTRACT

Techniques and mechanisms for identifying tag information that describes data to be cached at a processor. In an embodiment, a memory controller services a memory access request from the processor, wherein the memory controller reads multiple chunks of data from a memory device, and determines first tag information which corresponds to the multiple chunks. One or more of the multiple chunks are sent to the processor in a response to the request. Based on the first tag information, the memory controller detects for a match—if any—between at least two tags. Where such a match is detected, the memory controller further indicates to the processor that second tag information corresponds to the one or more chunks. In another embodiment, the first tag information is more granular than the second tag information.

20 Claims, 15 Drawing Sheets

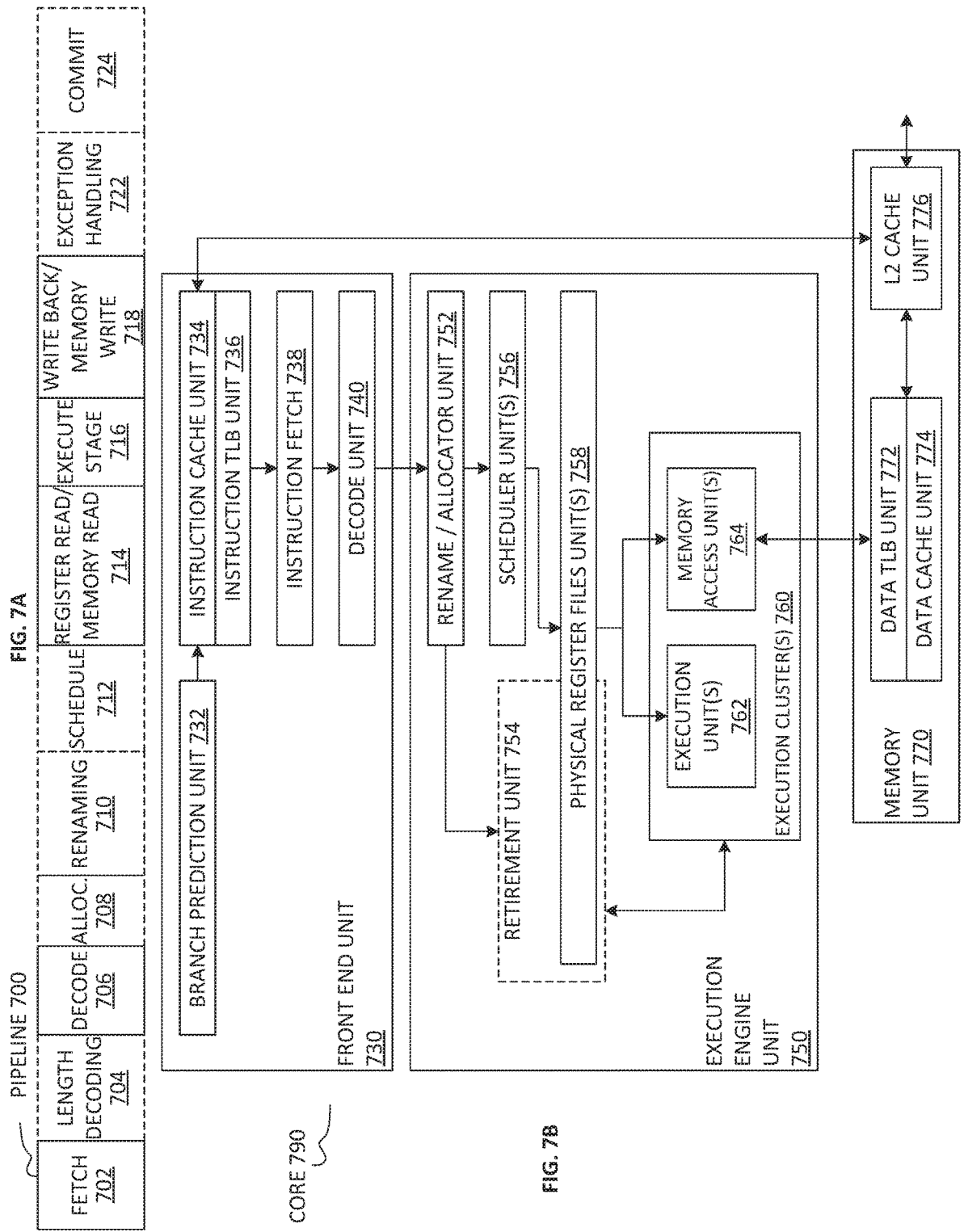

DEVICE, SYSTEM AND METHOD TO PROVIDE LINE LEVEL TAGGING OF DATA AT A PROCESSOR CACHE

BACKGROUND

1. Technical Field

This disclosure generally relates to memory systems and more particularly, but not exclusively, to the tagging of data at a cache of a processor.

2. Background Art

Since the beginning of computing, processors have been faster than memories. Even though memory technology has evolved and improved over time, so has processor technology. What this means is that processors often have to remain idle for substantial amounts of time while waiting for the memory to respond to a memory request. As a result, system performance can be negatively impacted.

Computer systems have evolved to include memory hierarchies comprising various types of long term storage, main memory, and caches. However, as one moves down the down the memory hierarchy from caches to long term storage, device access times increase dramatically. An ideal solution is to have enough cache memory or fast main memory available to service the currently executing program. But in most systems, such memory is present in only limited amounts or the program demands more memory than is available.

Caches are generally used to keep often used or recently used data close to or within the processor. The idea is that by storing recently used data in close proximity to the processor, the next time a memory request is made for that particular data, a long memory access to main memory or the hard disk drive is not necessary.

In conventional systems, "memory tagging" mechanisms provide metadata describing the type(s) of information for one or more objects in a given line of cache (or other) memory. When a line (or a portion thereof) is accessed, an accessing agent reads the data associated with the line, as well as metadata such as one or more tags associated with the cache line. This access may be a main memory access or a cache access. When a version of a given line in memory is being updated or otherwise accessed, data integrity is facilitated by comparing a tag value for a given data object with an expected tag value for that object.

BRIEF DESCRIPTION OF THE DRAWINGS

The various embodiments of the present invention are illustrated by way of example, and not by way of limitation, in the figures of the accompanying drawings and in which:

FIG. 7A is a block diagram illustrating both an exemplary in-order pipeline and an exemplary register renaming, out-of-order issue/execution pipeline according to embodiments of the invention.

FIG. 7B is a block diagram illustrating both an exemplary embodiment of an in-order architecture core and an exemplary register renaming, out-of-order issue/execution architecture core to be included in a processor according to embodiments of the invention;

DETAILED DESCRIPTION

Figure 1:
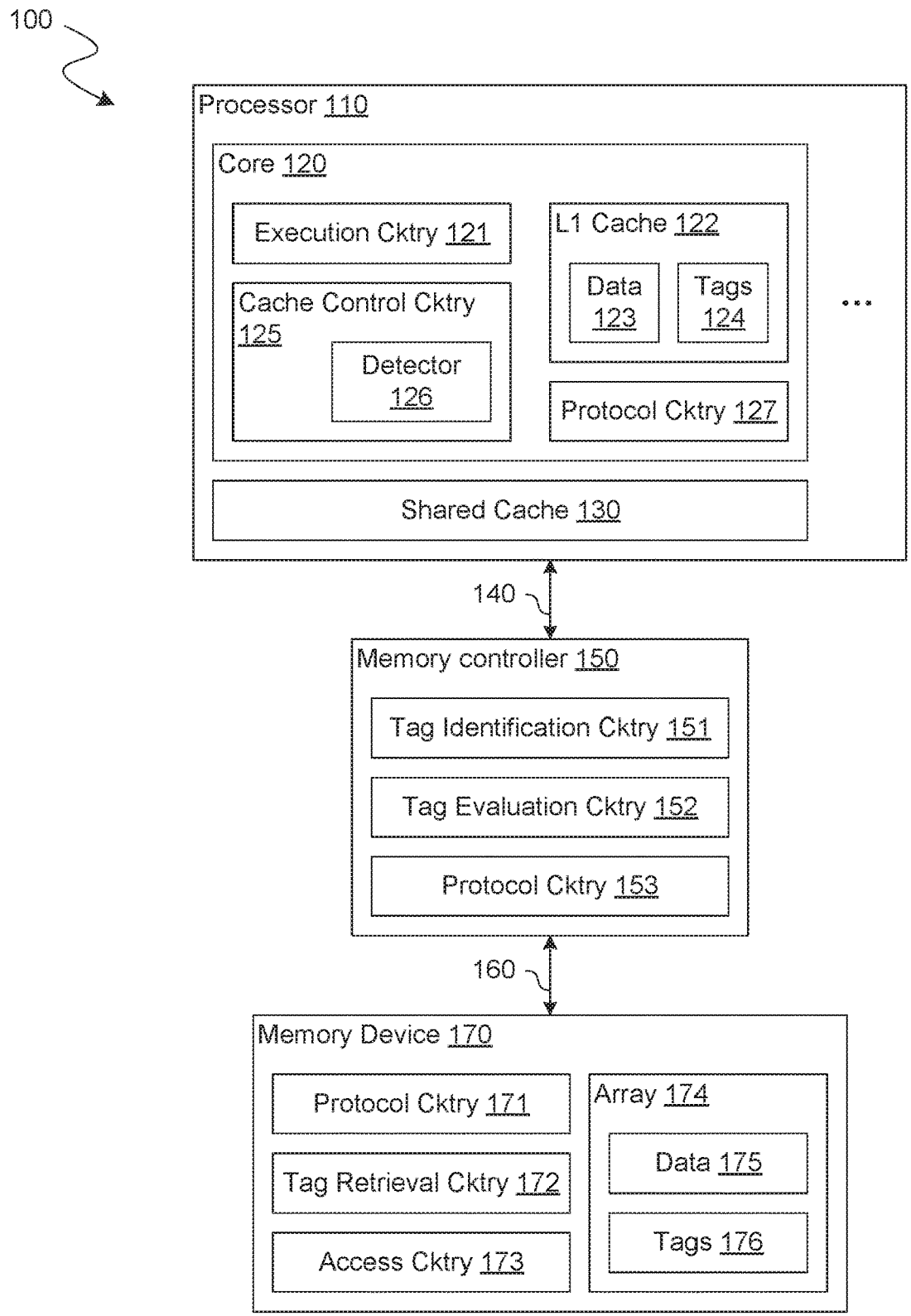
FIG. 1 illustrates a functional block diagram showing features of a system to reduce a granularity of tag information according to an embodiment.

Embodiments discussed herein variously provide techniques and mechanisms for tagging data at different respective levels of granularity, where one such level is for lines of a cache memory of a processor, and a different such level is for lines of a memory device which is coupled to said processor.

As used herein in the context of tagging data (also referred to in the art as "memory tagging"), "tag" refers to metadata, the value of which identifies a particular class of information to which a corresponding one or more chunks of data belong. Unless otherwise indicated, "tag" refers herein to a metadata value which identifies one and only one corresponding class of information, where (for example) "tag information" could include one or more such tags.

The term "chunk" refers herein to a discrete quantity of data (e.g., wherein a line of a cache memory or other memory comprises multiple chunks) the entirety of which is able to be classified or otherwise described, by type, with a corresponding tag. For example, in some embodiments, the value of a tag identifies one or more corresponding chunks as each being associated with a particular one or more processes (and/or other system resources) that are authorized to access the chunks. However, any of various additional or alternative types of memory tagging are supported, in different embodiments.

As used herein in the context of tagging data, "granularity," "granular" and related terms variously refer to an amount of data—e.g., a total number of one or more chunks—which correspond to a particular one tag. For example, as described herein, some embodiments variously provide a first level of tagging granularity with a first tag which is used to identify an information type of each chunk of a first one or more chunks. Such embodiments further provide a second level of tagging granularity with a second tag which is used to identify an information type of each chunk of a second one or more chunks, wherein a total number of the first one or more chunks is different than a total number of the second one or more chunks.

In various embodiments, data tagging for a cache of a processor is relatively coarse grained (less granular), as compared to other data tagging for a memory device which is coupled to the processor. For example, some embodiments tag data which is cached at a processor on a one tag per cache line basis—e.g., wherein tagging for the memory device is at a sub-line (e.g., one tag per chunk) basis. In providing this relatively coarse-grained (less granular) tagging at a processor, some embodiments variously enable alternative uses for bits that would otherwise be used to store additional tags at said processor. By way of illustration and not limitation, some embodiments variously facilitate the adaptation of such bits so that the processor is able to use larger tags (that is, with more bits-per-tag). As described in more detail herein, relatively coarse-grained (less granular) tagging is to be distinguished from other, relatively fine-grained (more granular) tagging which uses a tag to represent relatively greater number chunks.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

FIG. 1 shows features of a system 100 to provide metadata to a processor according to an embodiment. System 100 is one example of an embodiment wherein a first granularity of memory tagging (e.g., a first number of one or more chunks per tag) is provided for data at a cache of a processor, and a different granularity of tagging is provided for data at a memory device which is coupled to the processor via a memory controller. In various embodiments, system 100 includes some or all of any of various computing devices and/or data platforms such as a laptop, personal digital assistant (PDA), media content player, imaging device, mobile Internet device (MID), any smart device such as a wireless smart phone, smart tablet, smart TV, computer server, and so on, or combinations thereof.

As shown in FIG. 1, system 100 includes a processor 110, a memory device 170, and a memory controller 150 which is coupled therebetween—via interconnects 140, 160—to facilitate access to memory device 170 by processor 110. In an embodiment, a main memory of system 100 comprises memory device 170—e.g., where processor 110 is coupled to memory device 170 via one or more memory busses and/or other suitable interconnect structures.

Processor 110 includes any of various types of processors such as, for example, micro-processor, an embedded processor, a digital signal processor (DSP), a central processing unit (CPU), a graphical processing unit (GPU), a visual processing unit (VPU), a network processor, FPGA, a device to execute code to implement the technologies described herein, and so on, or combinations thereof. In various embodiments, processor 110 includes one or more cores (e.g., including the illustrative core 120 shown). In one such embodiment, processor 110 includes one or more single-threaded cores, multithreaded cores including more than one hardware thread context (or "logical processor") per core, and so on, or combinations thereof. In an embodiment, execution circuitry 121 of core 120 includes an instruction decoder to recognize and/or decode an instruction (e.g., from an instruction register), to activate appropriate circuitry to execute the instruction, to verify that a stream of instructions (e.g., operation codes, etc.) will compute, and so on, or combinations thereof.

Memory device 170 includes any of various types of memory technology comprising an array of memory cells, where data is accessible via a wordline or the equivalent. In one embodiment, memory device 170 includes dynamic random access memory (DRAM) technology. Memory device 170 is provided, for example, with an integrated circuit package within a larger memory device (not shown) of system 100. In one such embodiment, memory device 170 is or otherwise includes a DRAM device of a memory module such as a dual in-line memory module (DIMM).

Memory device 170 includes memory resources, including the illustrative memory array 174 shown, which (for example) are arranged into one or more logical and/or physical groups. Memory array 174 comprises storage elements arranged in rows and columns. In an embodiment, memory array 174 comprises a plurality of banks which, for example, are disposed on a single integrated circuit chip (not shown) of memory device 170. In an embodiment, the plurality of banks consist of banks in an integrated circuit package—e.g., of a 3D stacked (or other) memory device wherein the banks variously reside on a different chips of an IC chip stack.

Processor 110, memory controller 150, and memory device 170 comprise protocol circuitry 127, protocol circuitry 153, and protocol circuitry 171 (respectively) which variously support the communication of commands and/or other signals whereby memory controller 150 is to access memory device 170 on behalf of processor 110. In one such embodiment, some or all of protocol circuitry 127, protocol circuitry 153, and protocol circuitry 171 perform one or more operations which, for example, are adapted from conventional techniques for communicating commands, data and/or other information with a memory device. By way of illustration and not limitation, protocol circuitry 127, protocol circuitry 153, and/or protocol circuitry 171 support communications which are compatible with any of various standards including (for example) one or more the Double Data Rate Type Four (DDR4) Synchronous Dynamic Random-Access Memory (SDRAM) specification JESD79-4B, published June, 2017 by the JEDEC Solid State Technology Association of Arlington, Virginia, the Double Data Rate Type Three (DDR3) SDRAM specification JESD79-3F, published July, 2012 by the JEDEC Solid State Technology Association, or the like.

Memory device 170 includes access circuitry 173 to facilitate, at least in part, access to memory array 174—e.g., where such access is provided for servicing one or more commands from memory controller 150. In one such embodiment, access circuitry 173 includes, or operates in conjunction with, logic of memory device 170 which provides resource access according to conventional techniques. For example, access circuitry 173 comprises row decode circuitry and column decode circuitry which are used to decode an access instruction to the proper memory location within array 174. Alternatively or in addition, access circuitry 173 comprises sense amplifiers, precharge circuitry, control logic and/or other suitable circuitry to facilitate reads to and/or writes from array 174.

In various embodiments, processor 110 comprises internal storage including one or more levels to store data (e.g., instructions, operands, program data, etc.) utilized by execution circuitry 121 and/or one or more other components of processor 110. For example, core 120 comprises a L1 cache 122 and cache control circuitry 125 to selectively perform reads from and/or writes to L1 cache 122. In certain embodiments, L1 cache 122 includes any type of cache such as, for example, an instruction cache, a data cache, a single level cache, a multi-level cache, a shared cache, a strictly inclusive cache, an exclusive cache, and so on, or combinations thereof. In various embodiments, core 120 further includes a mid-level cache, such as level 2 (L2), level 3 (L3), level 4 (L4), or other levels of cache (not shown). Alternatively or in addition, processor 110 comprises one or more caches—such as the illustrative shared cache 130 shown—which are accessible by core 120 and, in some embodiments, one or more other cores (not shown) of processor 110. In various embodiments, processor 110 comprises more, fewer and/or differently configured caches.

With L1 cache 122 and shared cache 130, cache control circuitry 125 and/or other resources of processor 110 are operable to store cached (e.g., modified or other) versions of data which is stored at array 174. For example, on behalf of execution circuitry 121, cache control circuitry 125 is able to check whether data is located in L1 cache 122 to execute one or more instructions and/or other data (e.g., program data, etc.), where a cache miss may cause a transfer of the data from memory device 170 to L1 cache 122 and/or to shared cache 130.

In response to memory access requests from processor 110, memory controller 150 sends commands to memory device 170 over a command bus (e.g., a command/address bus), which are then interpreted by memory device 170. Memory device 170 decodes the command information to perform a variety of access functions within the memory, and decode address information via access circuitry 173. For example, access circuitry 173 accesses a specific line in array 174 with a combination of a column address strobe or signal (CAS) and a row address strobe or signal (RAS). Rows of memory are implemented, for example, in accordance with known memory architectures or their derivatives. In one such embodiment, a row of memory spans one or more addressable columns of memory cells, as identified (for example) by the CAS generated by column decode logic of access circuitry 173. Rows are each addressable via a respective RAS generated by row decode logic of access circuitry 173.

At a given time during operation of system 100, a line of array 174 comprises multiple chunks which each represent a respective data object (or portion thereof). Efficient access to some or all such chunks is provided with one or more caches of processor 110—e.g., where the one or more chunks are cached at L1 cache 122, at shared cache 130, and/or the like. In an illustrative scenario according to one embodiment, array 174 stores data 175, wherein data 123 stored at L1 cache 122 includes a version of some of data 175.

In an embodiment, one or more resources of memory device 170 provide functionality to maintain metadata for data 175 and/or other information that is stored at array 174—e.g., wherein such metadata comprises tags 176 that classify or otherwise describe data 175. Tags 176 comprise respective values which each correspond to a respective one or more chunks of data 175—e.g., where each such value specifies a "color" or other identifier of a particular information class to which the one or more chunks belong. In some embodiments, tags 176 are stored at one or more lines of array 174 (or portions of lines) which are reserved to store tag information. In other embodiments, tags 176 are maintained in a memory region which also stores error correction information—e.g., wherein one or more bits of an error correction code field of the memory region are reserved to store tag information. Some embodiments are not limited to a particular data structure and/or other mechanism by which tags 176 (or other such metadata) are made available at memory device 170.

To protect data integrity and/or otherwise facilitate operation of system 100, processor 110 caches or otherwise maintains tag information which similarly describes data that (for example) is cached at L1 cache 122, shared cache 130 and/or one or more other caches of processor 110. By way of illustration and not limitation, cache control circuitry 125 further accesses L1 cache 122 to store tags 124 which each correspond to a respective one or more chunks of data 123—e.g., wherein tags 124 are based on tags 176. In other embodiments, tags 124 are maintained at any of various alternative resources of processor 110—e.g., where a translation lookaside buffer (not shown) of core 120 comprises entries which each store, point to, or otherwise indicate a respective tag in association with an address corresponding to one or more chunks of data 123. In some embodiments, circuit resources of processor 110 (such as the illustrative detector 126 shown) provide functionality to evaluate tag information—e.g., by comparing one of tags 124 to an expected tag value to detect for a "use after free" pointer error and/or any of various other processor errors.

In various embodiments, access circuitry 173 includes, is coupled to, or otherwise operates with circuitry (e.g., that of the illustrative tag retrieval circuitry 172 shown) which, in response to a command from memory controller 150 to access a line of array 174, accesses a corresponding one or more of tags 176. Such access to tags 176 with tag retrieval circuitry 172 includes operations which, for example, are adapted from conventional memory tagging techniques (which are not detailed herein to avoid obscuring certain features of said embodiments). The retrieved tags are provided to memory controller 150 to facilitate the servicing of a memory access request from processor 110. In one such embodiment, circuit logic of memory controller 150 evaluates the tags to determine whether a response to the memory access request is to indicate that some tag information (which provides relatively more coarse granularity than that provided by tags 176) is to correspond to chunks which are communicated in the response.

In an illustrative scenario according to one embodiment, during operation of system 100, memory controller 150 services a request, from processor 110, to access an addressable location of memory device 170. Based on the request, memory controller 150 reads data from the addressable location, where the data comprises multiple chunks. For example, based on communications with protocol circuitry 153 (the communications on behalf of a software process executed with execution circuitry 121), protocol circuitry 171 signals access circuitry 173 to retrieve some or all of data 175 from a line of array 174. Furthermore, memory controller 150 determines first tag information which corresponds to the data—e.g., wherein, responsive to protocol circuitry 153, protocol circuitry 171 signals tag retrieval circuitry 172 to retrieve multiple ones of tags 176.

The data and the corresponding first tag information are communicated from memory device 170 to memory controller 150 using protocol circuitry 171, and protocol circuitry 153. Memory controller 150 provides functionality to detect a match between two or more tags of the first tag information. For example, tag identification circuitry 151 of memory controller 150 comprises circuitry to snoop or otherwise detect a communication of the first tag information from memory device 170. In some embodiments, tag identification circuitry 151 further snoops or otherwise detects a communication of the memory access request from processor 110 (and/or other signals communicated in association with the memory access request)—e.g., whereby tag identification circuitry 151 identifies a reference tag value that is to be used as a basis for detecting matching tags of the first tag information.

Tag evaluation circuitry 152 of memory controller 150 is coupled to receive identified tags from tag identification circuitry 151 and to detect for matches (if any) between such tags. In an example scenario, memory controller 150 determines that two or more tags of the first tag information match each other—e.g., where the two or more tags are each identified as being equal to a reference tag value which is provided to memory controller 150 by processor 110. In one such scenario, memory controller 150 sends to processor 110 a response to the memory access request, where the response comprises two or more chunks of the multiple chunks. Based on the detected match between the two or more tags of the first tag information, tag evaluation circuitry 152 signals protocol circuitry 153 to further indicate to processor 110 that second tag information corresponds to the two or more chunks. For example, protocol circuitry 153 includes one instance of the matching tag value (e.g., equal to the reference tag value) in the response to the memory access request. Alternatively, protocol 153 includes in the response an indication that the two or more chunks can be cached at processor 110 each in association with a common single instance of the reference tag value.

In various embodiments, the first tag information provides a first granularity at which the multiple chunks each correspond to a respective tag, wherein the second tag information provides a second granularity at which the two or more chunks each correspond to a respective tag. In one such embodiment, the first granularity is more fine than the second granularity—e.g., wherein the first granularity is one tag per chunk, and wherein the second granularity is one tag per line (such as a cache line).

In some alternative scenarios according to various embodiment, tag evaluation circuitry 152 detects a condition wherein two or more tags of the first tag information (but not all such tags) each match a reference tag value provided by processor 110. In various embodiments, such a condition causes protocol circuitry 153 to include, in a response to the memory access request, control information which indicates that processor 110 is to forego a caching of data which is provided in the response. The data includes, for example, at least those chunks which are of an information type which corresponds to the reference tag value.

In another alternative scenario, tag evaluation circuitry 152 fails to detect a match between any two tags of the first tag information (and/or fails to detect a match between any tag of the first tag information and a reference tag value provided by processor 110). In one such embodiment, the failure to detect such a match causes signal protocol circuitry 153 to forego sending any data to processor 110 in response to the memory access request—e.g., where protocol circuitry 153 instead sends an error message. Alternatively, such a failure causes signal protocol circuitry 153 to include in the response control information which indicates that processor 110 is to forego a caching of data which is provided in the response—e.g., wherein the data includes all chunks read from a line in array 174 based on the memory access request.

Figure 2:
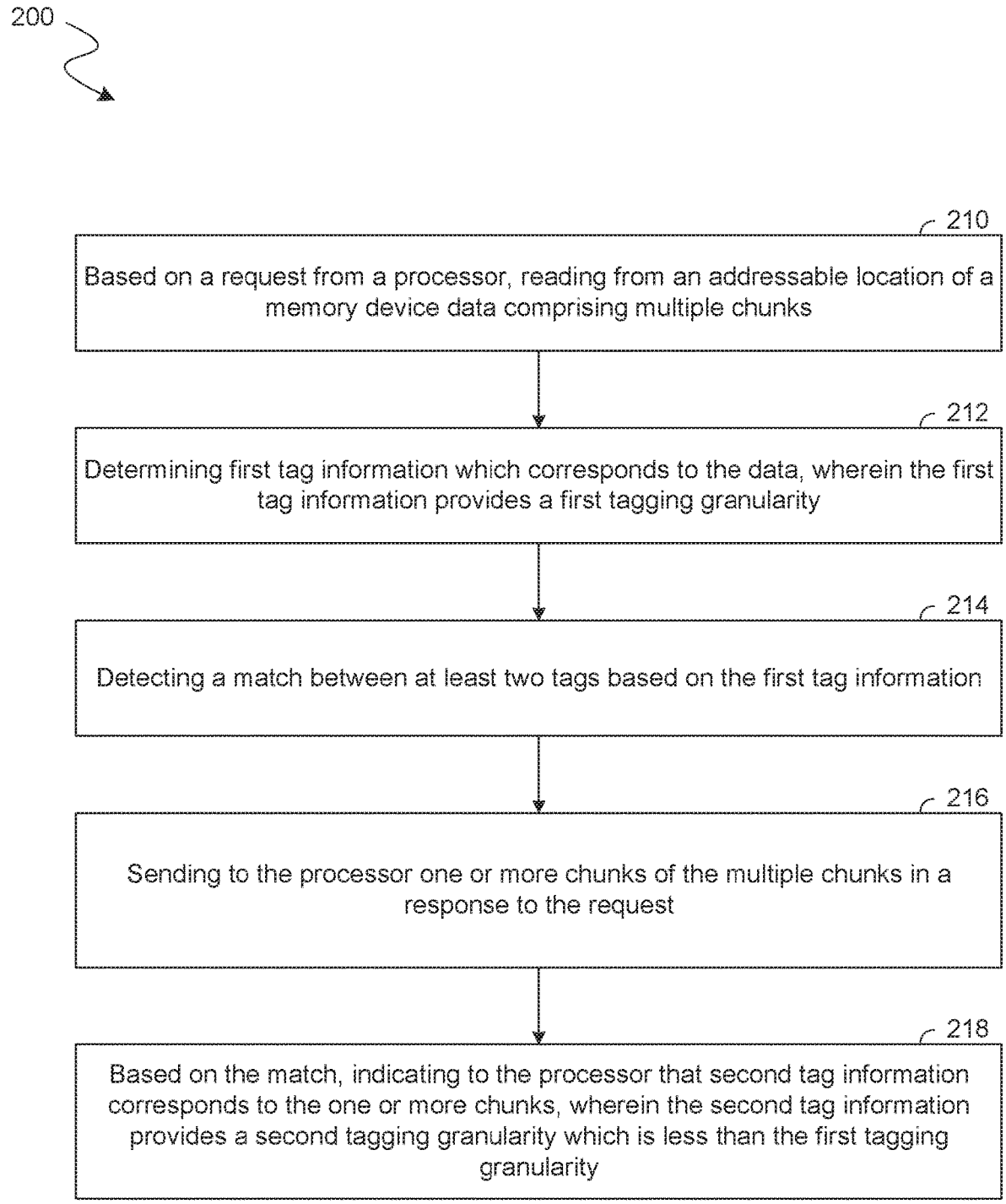
FIG. 2 illustrates a flow diagram showing features of a method to operate a memory controller according to an embodiment.

FIG. 2 shows features of a method 200 to operate a memory controller according to an embodiment. Method 200 is one example of an embodiment wherein a memory controller performs an evaluation of tag information, which is determined based on a memory access request, to determine whether relatively coarse granularity tag information is to represent data to be provided to a processor. In various embodiments, method 200 is performed at a memory controller such as memory controller 150 (for example).

As shown in FIG. 2, method 200 includes (at 210) a memory controller reading data from an addressable location of a memory device, where the reading is based on a memory access request which the memory controller receives from a processor. The data read at 210 comprises multiple chunks—e.g., wherein memory controller 150 reads chunks of data 175 from a line of array 174 in response to a read request from processor 110.

Method 200 further comprises (at 212), in response to the request from the processor, determining first tag information which corresponds to the data which is read at 210. In some embodiments, the data and the first tag information are both communicated from the memory device in the same response to a read command from the memory controller. The first tag information provides a first granularity at which the multiple chunks each correspond to a respective tag—e.g., wherein the first tag information comprises multiple tags each corresponding to a respective one or more of the multiple chunks.

Method 200 further comprises (at 214) detecting a match between at least two tags based on the first tag information. For example, in some embodiments, the request from the processor (or a signal communicated from the processor to the memory device in association with the request) comprises a first tag which is to be a basis for identifying any matching tags of the first tag information. In one such embodiment, the detecting at 214 comprises determining that one or more tags of the first tag information are each equal to the first tag provided by the processor. For example, the detecting at 214 comprises performing a first evaluation which, in one scenario, determines that the first tag is equal to a second tag of the first tag information. In one such embodiment, the detecting at 214 further comprises performing a second evaluation, based on the first evaluation, to determine whether all other tags of the first tag information each match the first tag.

Method 200 further comprises (at 216) sending to the processor one or more chunks of the multiple chunks in a response to the request. For example, the one or more chunks are each of an information type which is indicated by the matching tags. In one such embodiment, the response omits one or more other chunks of the multiple chunks—e.g., wherein the one or more other chunks are each of a respective information type other than that indicated by the matching tags.

Method 200 further comprises (at 218) indicating to the processor, based on the match detected at 214, that second tag information corresponds to the one or more chunks. In some embodiments, the second tag information provides a second granularity at which the one or more chunks each correspond to a respective tag, wherein the first granularity is more than the second granularity. For example, in one such embodiment, the memory controller includes only one instance of the matching tag value (e.g., the first tag provided by the processor) in the response to the memory access request. Alternatively, the memory controller includes in the response an indication that the one or more chunks are to be written to a cache line of the processor, where a single instance of the first tag is to be associated with all chunks of the cache line.

In some embodiments, method 200 further comprises operations (not shown) to flag some or all chunks of data which are provided to the processor in a response to a memory access request. In this context, "flag," "flagging" and related terms refer generally to providing an indication that a processor, or other such resource, is to forego a caching of the data in question. For example, in one such embodiment, the memory controller further receives from the processor a second request to access a second addressable location of the memory device. Based on the second request, the memory controller reads second data from the second addressable location (the second data comprising a second multiple chunks) and determines some third tag information which corresponds to the second data.

In an illustrative scenario according to one such embodiment, the memory controller detects a mismatch between a third tag which is provided by the processor and a fourth tag of the third tag information. The memory controller sends to the processor a second response to the second request, wherein the second response comprises a second one or more chunks of the second multiple chunks. Based on the mismatch, the second response further comprises an indication that the processor is to forego a write of the second one or more chunks to a cache of the processor. In one such embodiment, the second request is on behalf of a process which is executed with a core of the processor, wherein the core comprises the cache. By way of illustration and not limitation, the cache is a L1 cache of the core, wherein the indication is further to prevent a write of the one or more chunks to another cache of the processor (e.g., a L2 or other cache of the core, or a cache which is shared by multiple cores of the processor).

Figure 3:
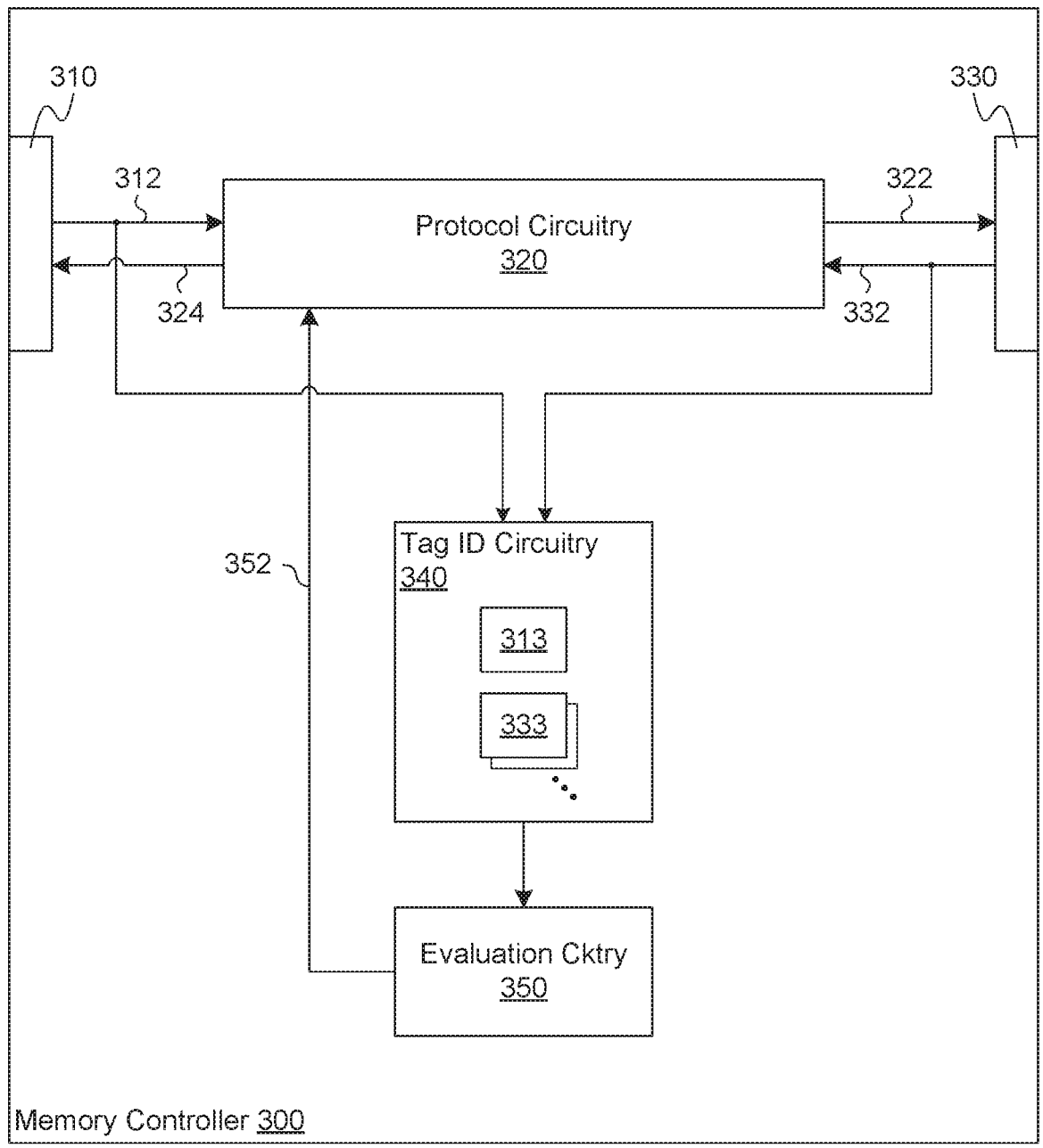
FIG. 3 illustrates a functional block diagram showing features of a memory controller to provide metadata to a processor according to an embodiment.

FIG. 3 shows features of a memory controller 300 to communicate tag information with a processor according to an embodiment. Memory controller 300 is one example of an embodiment which detects a match between tag values and, based on such a match, facilitates a relatively less granular (coarse granularity) tagging for data which is to be cached at a processor. In some embodiments, memory controller 300 evaluates whether a reference tag—e.g., sent from the processor to indicate an expected information type for a requested chunk—matches the actual tag for the requested chunk, which is read from a line in the memory device. In one such embodiment, memory controller 300 further evaluates whether, for all chunks of such a line, the corresponding tags for said chunks are each equal to the reference tag. Based on such evaluations, memory controller 300 determines whether to flag data as being unqualified for caching at the processor. Memory controller 300 includes features of memory controller 150, in various embodiments—e.g., where functionality of memory controller 300 is provided according to method 200.

As shown in FIG. 3, memory controller 300 includes hardware interfaces 310, 330 by which memory controller 300 is to be coupled, respectively, to a processor and a memory device (e.g., to processor 110 and memory device 170). In an embodiment, memory controller 300 further comprises protocol circuitry 320, tag ID circuitry 340, and evaluation circuitry 350 which correspond functionally to protocol circuitry 153, tag identification circuitry 151, and tag evaluation circuitry 152 (respectively).

During operation of memory controller 300, protocol circuitry 320 receives via hardware interface 310 a request 312 from a processor to access a memory device which is coupled to memory controller 300 via hardware interface 330. Based on request 312, protocol circuitry 320 sends via hardware interface 330 a command 322 to read an addressed line which comprises multiple chunks of data. In response to command 322, the memory device provides to protocol circuitry 320 one or more signals (such as the illustrative signal 332 shown) which communicate the multiple chunks, as well as tags 333 which each correspond to a different respective one or more of said chunks. Some or all of the multiple chunks are to be communicated to the processor in a response 324 to request 312.

In various embodiments, request 312 comprises (or is otherwise communicated with) a reference tag 313 which is to be used as basis for evaluating the tags 333. For example, tag identification circuitry 340 of memory controller 300 comprises circuitry to snoop or otherwise detect the communication of tag 313 with request 312, and to further snoop or otherwise detect the communication of tags 333 with signal 332. Tag identification circuitry 340 provides to evaluation circuitry 350 the identified tag 313 and one or more of tags 333, wherein evaluation circuitry 350 determines which (if any) of the one or more of tags 333 match tag 313.

In one such embodiment, evaluation circuitry 350 generates a signal 352 which is based on the evaluation of tags 333 with tag 313. Signal 352 communicates to protocol circuitry 320 whether or how response 324 is to indicate that some particular tag information corresponds to the one or more data chunks which are communicated in response 324. In an embodiment, tag information which is communicated with (or otherwise indicated by) response 324 provides a tagging granularity which is relatively coarse (less granular) than a tagging granularity of tags 333.

Figure 4:
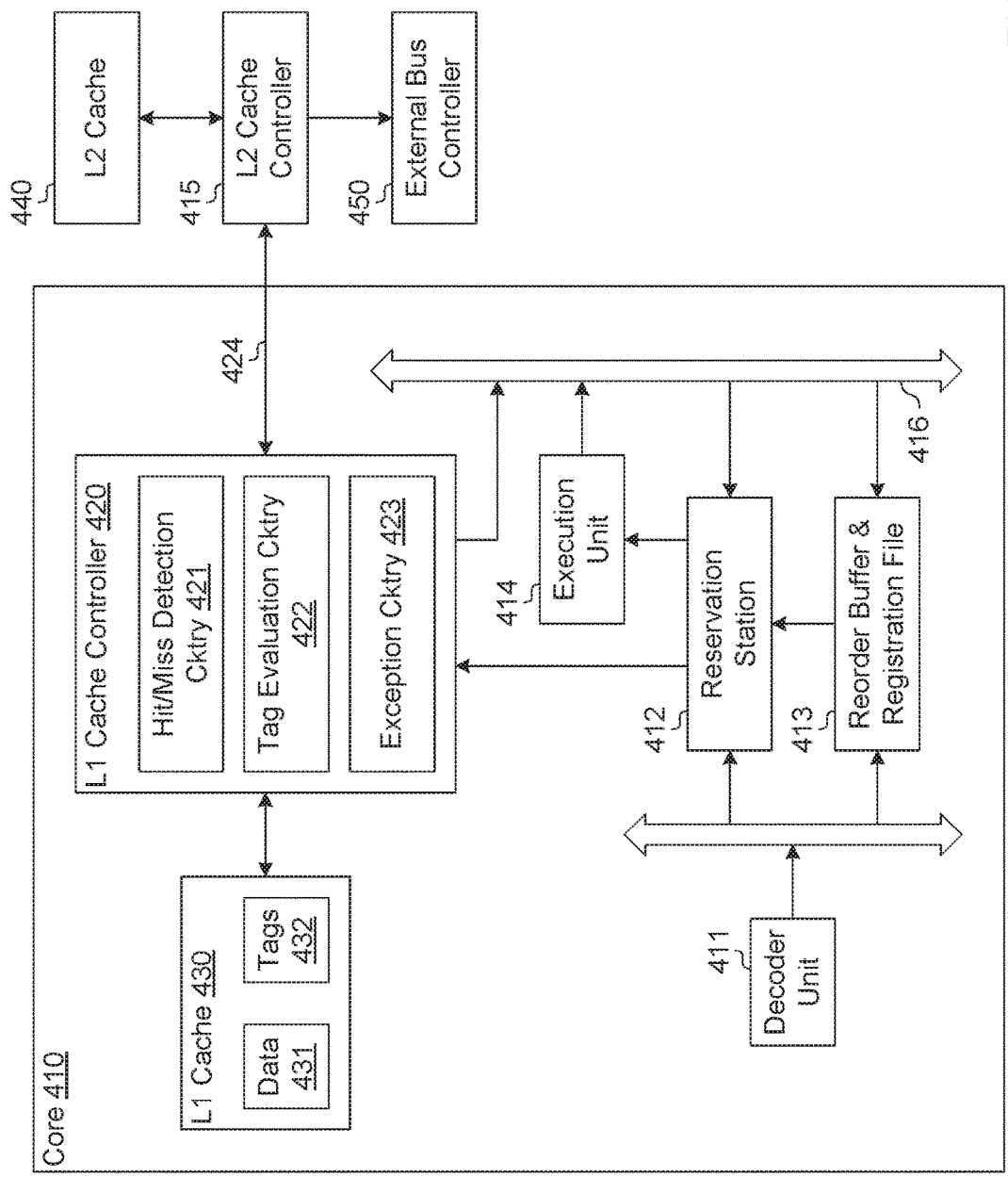
FIG. 4 illustrates a functional block diagram showing features of a processor to communicate tag information with a memory controller according to an embodiment.

FIG. 4 shows features of a processor 400 to communicate tag information with a memory controller according to an embodiment. Processor 400 illustrates one example of an embodiment which facilitates a first tagging for data at a processor cache, wherein the first tagging is less granular than (has relatively course granularity, compared to) a second tagging for data at a memory device which is to be coupled to the processor. In various embodiments, processor 400 includes features of processor 110—e.g., where tag information is provided to processor 400 according to method 200.

As shown in FIG. 4, a core 410 of processor 400 comprises, among other things, a decoder unit 411, an execution unit 414, a Level 1 ("L1") cache 430, and a L1 cache controller 420. Core 410 is coupled to a Level 2 ("L2") cache 440, a L2 cache controller 415 and an external bus controller 450 of processor 400.

In one embodiment, the processor 400 is an out-of-order processor, in which case the processor core 410 further comprises a reservation station 412 and a logical block having a reorder buffer and a register file 413. It is to be noted that there are other out-of-order execution architectures used in various embodiments. However, in another embodiment, the processor 400 is an in-order processor, in which case the reservation station 412 and/or the reorder buffer may not be needed. In either case, some embodiments operate with any of various types of processors (e.g., out-of-order, in-order, etc.). For clarity sake, all references made to the reorder buffer and/or the register file will be designated by numeral 413, even though they are separate logical units within the logical block 413. The register file 413 includes a plurality of general purpose registers. It is to be appreciated that the processor 400 actually includes many more components than just the components shown. Thus, only those structures useful to the understanding of some embodiments are shown in FIG. 4.

The decoder unit 411 decodes instructions and forwards them to the reservation station 412 and the reorder buffer 413. Execution unit 414 is coupled to facilitate the dispatching of such instructions. L1 cache controller 420 includes, is coupled to, or otherwise operates with hit/miss detection circuitry 421 which determines whether an instruction to be executed (e.g., load, store, etc.) "hits" one or more memory resources including L1 cache 430. Responsive to L1 cache controller 420, L1 cache 430 returns load request data for reservation station 412, the reorder buffer, and/or other suitable resources of core 410—e.g., by way of a writeback bus 416.

Where hit/miss detection circuitry 421 determines a "miss" of data at L1 cache 430, L1 cache controller 420 attempts to retrieve a version of such data from another memory resource. For example, in some embodiments, the L1 cache controller 420 is coupled to the L2 cache controller 415 and the external bus controller by way of a bus 424. The L2 cache controller 415 controls the L2 cache 440, and the external bus controller 450 interfaces with an external memory controller (not shown) through a bridge and/or other suitable interconnect structures. In one such embodiment, core 410 attempts to retrieve data from the L2 cache 440 and (if a similar data miss at L2 cache 440 is detected) then from a DRAM or other such memory device via the external memory controller.

To protect data integrity and/or otherwise facilitate operation of core 410, L1 cache controller 420, L2 cache controller, and/or other suitable resources of processor 400 maintain tags which each correspond to a respective multiple chunks of cached data. For example, L1 cache controller 420 stores to L1 cache 430 various tags 432 which each correspond to respective chunks of data 431—e.g., wherein data 431 and tags 432 correspond to data 123 and tags 124. Alternatively or in addition, L2 cache 440 similarly stores tags (not shown) for other cached data therein. To mitigate the impact of "use after free" (or other) errors, L1 cache controller 420 includes or otherwise operates with circuitry (such as the illustrative tag evaluation circuitry 422 shown) which determines whether a given one of tags 432 is equal to an expected tag value.

In various embodiments, exception circuitry 423 of L1 cache controller 420 selectively determines whether a given tag is to be written to L1 cache 430 (or otherwise cached at processor 400). Exception circuitry 423 is coupled to snoop, receive or otherwise detect a communication from a memory controller (not shown) that is to be coupled to processor 400 via external bus controller 450. In one such embodiment, the communication includes a value which flags data that, for example, is provided in a response to a memory access request by core 410 (where such flagging is to indicate that core 410 is to forego caching said data).

Figure 5A:
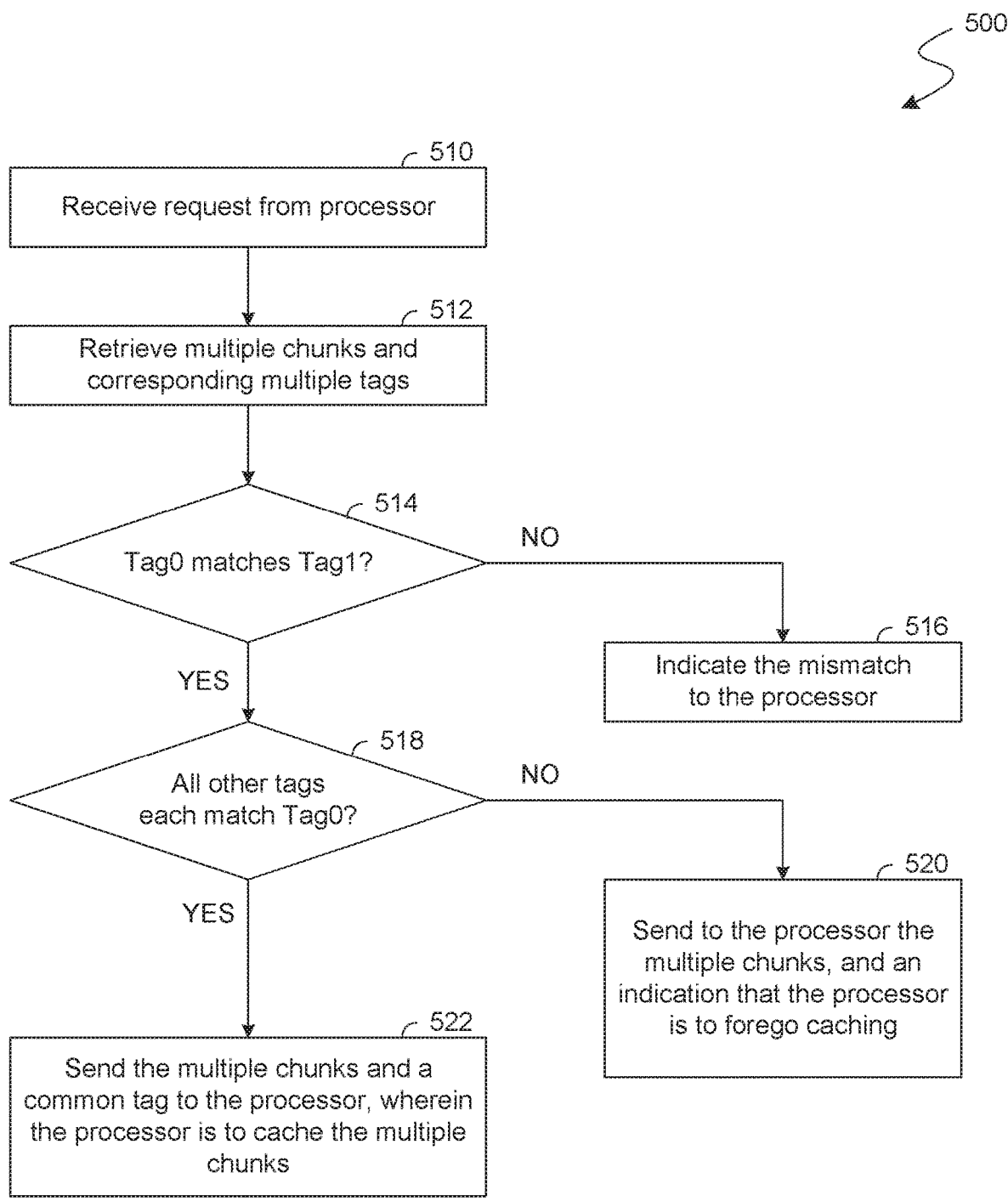
FIGS. 5A, 5B illustrate flow diagrams each showing features of a respective method to provide tag information according to a corresponding embodiment.

FIG. 5A shows features of a method 500 to provide metadata to a processor according to an embodiment. Method 500 is another example of an embodiment wherein a memory controller performs an evaluation of tag information to determine whether relatively less granular tag information is to represent data to be provided to a processor. In various embodiments, method 500 includes features of method 200 and/or is performed at a memory controller such as one of memory controllers 150, 300 (for example).

As shown in FIG. 5A, method 500 comprises (at 510) receiving at the memory controller a memory access request from a processor—e.g., wherein the request addresses a memory location (such as a line of a memory array) of a memory device which is coupled to the memory controller. In an embodiment, the memory access request includes or is otherwise communicated with a reference tag (Tag0) which is to be used as a basis for evaluating one or more tags for data at the memory device. In some embodiments, the request identifies a specific chunk of the memory line as being a more particular target from among the multiple chunks, wherein the Tag0 indicates an information type to which that specific chunk is expected to belong.

For example, method 500 further comprises (at 512) retrieving multiple chunks of data—which are read from the addressed memory location in response to the request—as well as multiple tags which each correspond to a different respective one or more of the multiple chunks. Method 500 further comprises (at 514) performing an evaluation to determine whether Tag0 matches some first tag (Tag1) of the multiple tags which are retrieved at 512.

Where it is determined at 514 that Tag0 does not match Tag1 method 500 sends a response (at 516) to indicate the mismatch to the processor. In one such embodiment, the response comprises an error message which is sent at 516 in lieu of providing any of the multiple chunks to the processor. In another embodiment, the response comprises some or all of the multiple chunks, as well as control information which flags the provided data (where the flagging indicates that the processor is to forego writing the data to one or more caches of the processor).

Where it is instead determined at 514 that Tag0 does match Tag 1, method 500 further performs one or more evaluations to determine (at 518) whether all other tags of the multiple tags each match Tag0. Where it is determined at 518 that one or more others of the multiple tags do not match Tag0, method 500 sends to the processor the multiple chunks (at 520), as well as control information which flags the multiple chunks (to indicate that the processor is to forego caching said chunks). Where it is instead determined at 518 that each of the multiple tags matches Tag0, method 500 sends the multiple chunks to the processor (at 522), wherein the processor caches the multiple chunks (e.g., in the absence of the memory controller providing an indication that the chunks are flagged).

Figure 5B:
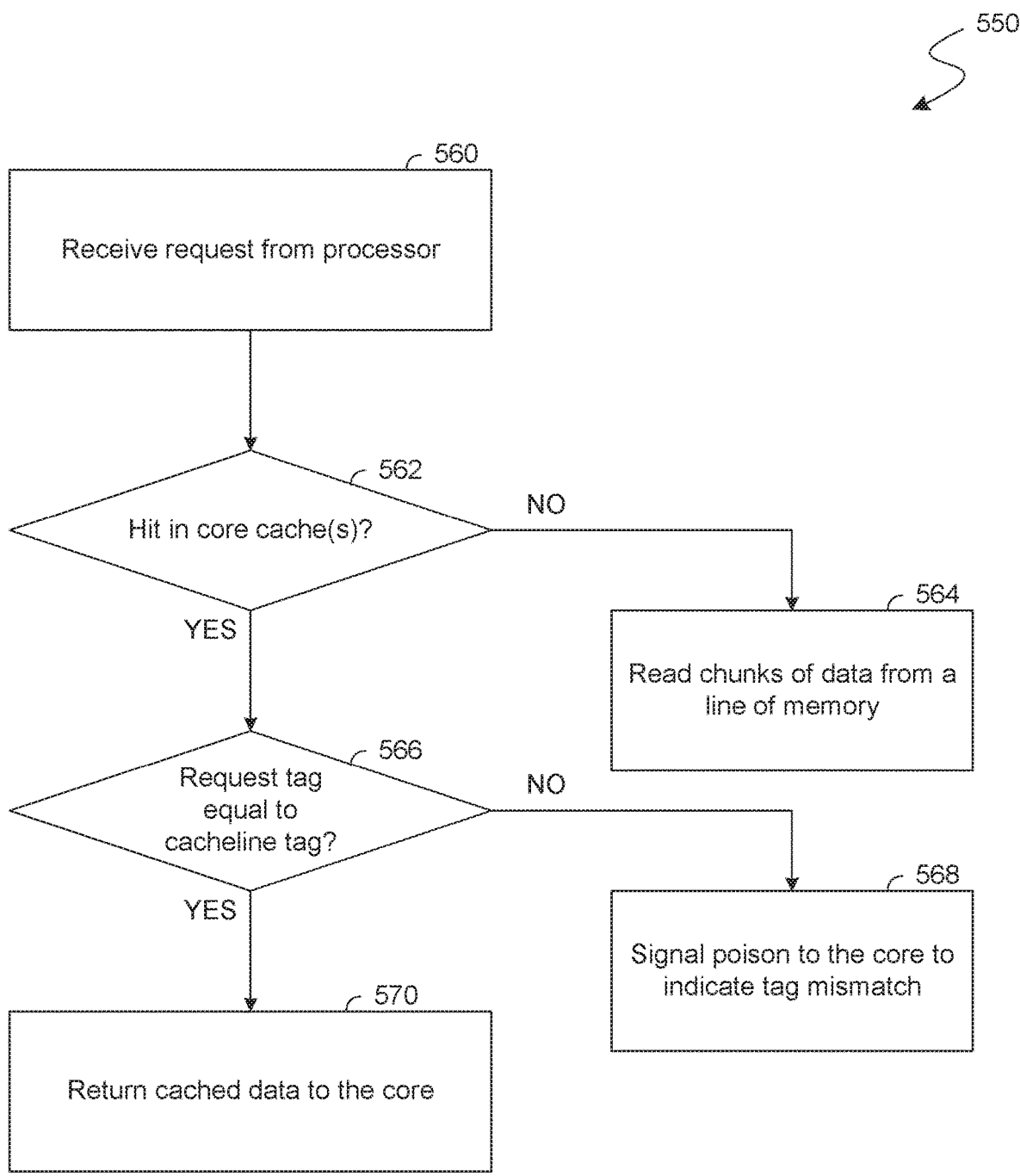

FIG. 5B shows features of a method 550 to access a tagged line of data according to another embodiment. In various embodiments, method 550 includes, or is otherwise based on, some or all of one of methods 200, 500—e.g., wherein method 550 is performed with cache control circuitry 125 or other suitable processor circuitry.

As shown in FIG. 5B, method 550 comprises (at 560) receiving, at cache control circuitry of a processor, a memory access request from a process which is executed by a processor core—e.g., wherein the request addresses a memory location (such as a line of a memory array) of a memory device which is coupled to the processor via a memory controller. Based on the request which is received at 560, a determination is made (at 562) as to whether the request hits a cache of the processor. Where no such cache hit is detected at 562, method 550 proceeds to read data chunks from a line in memory (at 564) which is addressed by the request. In one such embodiment, the reading at 564 corresponds the retrieving at 512—e.g., wherein operations of method 500 follow from said reading.

Where it is instead determined at 562 that a cache hit is indicated, method 550 (at 566) determines whether a tag, which is communicated with the request, is equal to another tag which corresponds to the cache line which the request hit. In one such embodiment, a single tag represents all chunks of the cache line which has been hit. Where it is determined at 566 that the request tag and the cache tag are not equal, method 550 (at 568) signals the processor core which originated the request, to communicate that a data poisoning is indicated by the tag mismatch. Where it is instead determined at 566 that the request tag matches the cache tag, method 550 (at 570) provides the requested data from the cache line to the requesting processor core.

Figure 6A:
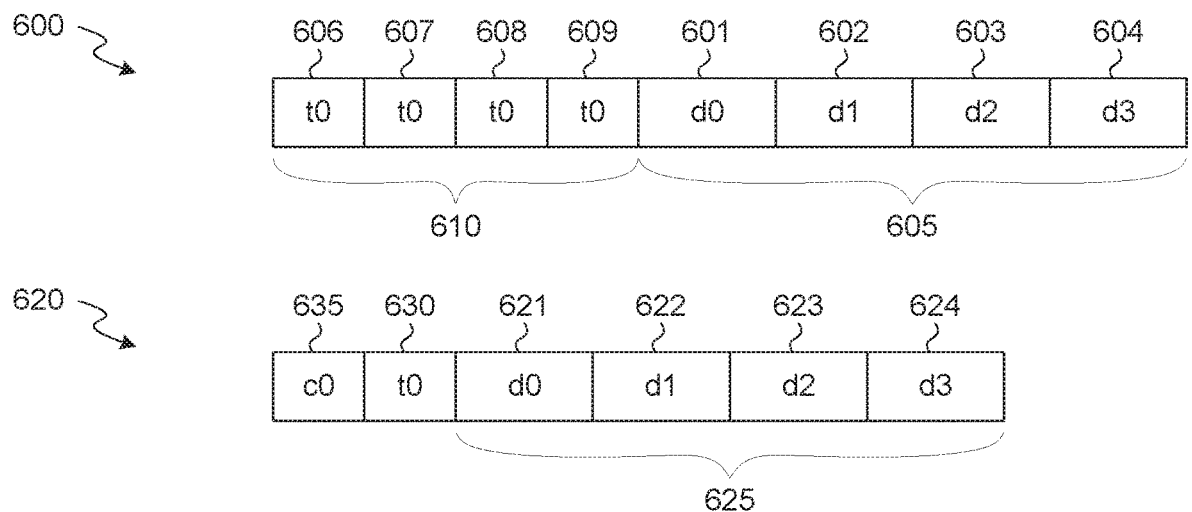
FIGS. 6A, 6B are data diagrams each showing respective feature of information that is communicated to facilitate memory tagging according to a corresponding embodiment.

FIG. 6A shows information 600 which a memory controller retrieves from a memory device to service a memory access request from a processor. FIG. 6A further shows information 620 which the memory controller generates or otherwise determines (based on information 600), and communicates to the processor in a response to the memory access request. In an embodiment, information 600 and/or information 620 is communicated, for example, with one of memory controllers 150, 300—e.g., where one of methods 20, 500 includes or is otherwise based on such communication.

As shown in FIG. 6A, information 600 comprises data 605 and tag information 610 for data 605. For example, chunks 601, 602, 603, 604 of data 605 include respective data objects d0, d1, d2, d3, wherein tag information 610 comprises tags 606-609 which correspond to chunks 601-604 (respectively). In the example embodiment shown, tags 606-609 are each equal to a tag value t0—e.g., where data objects d0, d1, d2, d3 are each of the same information class. In some embodiments, the same value t0 is provided by the processor as reference for the memory controller to evaluate tags 606-609. For example, the memory controller generates information 620 based on data 605 and further based on an evaluation as to whether any of tags 606-609 include data which is of the information class indicated by reference tag value t0.

In the illustrative scenario shown, data 625 of information 620 comprises chunks 621, 622, 623, 624 (based on chunks 601-604, respectively) which similarly include respective data objects d0, d1, d2, d3. In an embodiment, information 620 further comprises one or more values to indicate to the processor that a single instance of the tag value t0 is to serve as a tag for each of chunks 621-624.

For example, information 620 further comprises one tag 630 to identify the tag value t0 for all chunks 621-624 of data 625. Additionally or alternatively, information 620 further comprises a flag field 635, the value (c0) of which indicates that data 625 is not flagged (and qualifies to be cached at the processor). In one such embodiment, information 620 omits tag 630—e.g., wherein the processor itself (in the absence of the memory controller indicating to the contrary with, for example, flag field 635) automatically associates the tag value t0 with any chunks provided in the response to the memory access request.

Figure 6B:
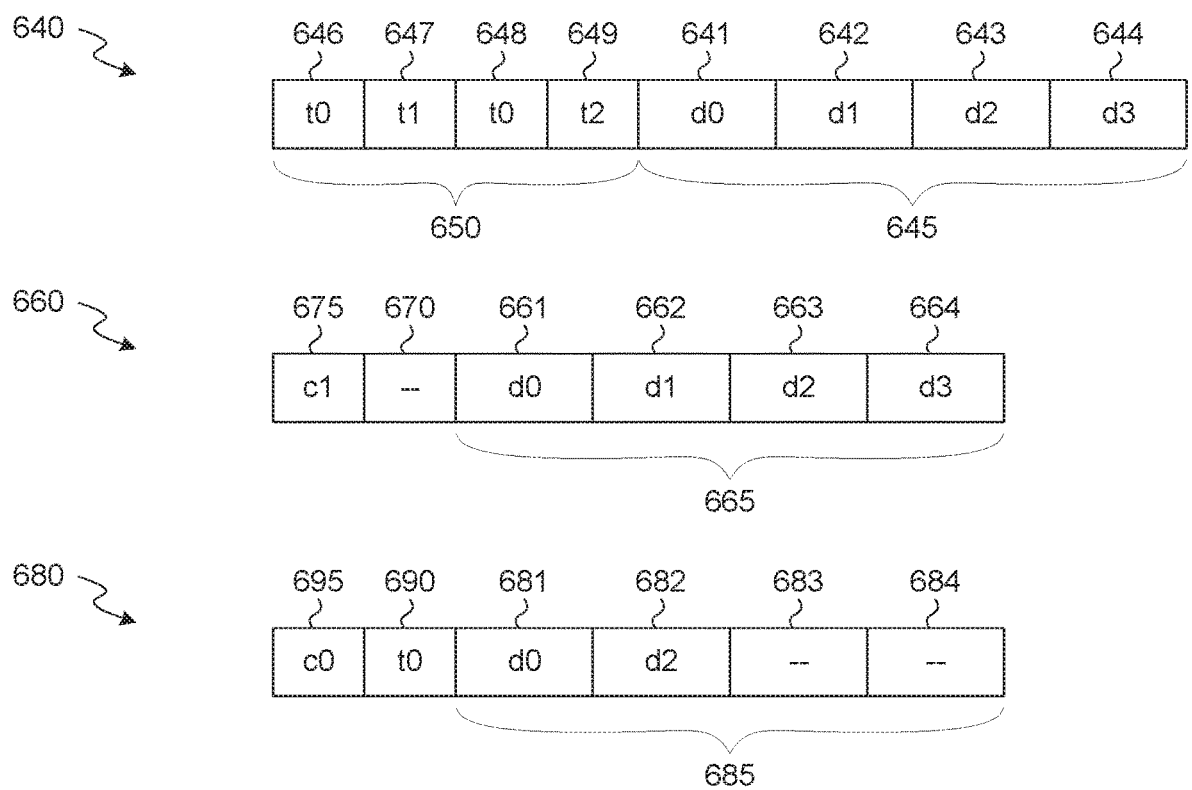

FIG. 6B shows information 640 which a memory controller retrieves from a memory device to service a memory access request from a processor. Furthermore, FIG. 6B shows information 660 which, in some embodiments, the memory controller generates or otherwise determines (based on information 640), and communicates to the processor in a response to the memory access request. Furthermore, FIG. 6B shows alternative information 680 which, in other embodiments, the memory controller instead determines (based on information 640) and communicates to the processor in the response. Information 640, and one of information 660 or information 680, is communicated, for example, with one of memory controllers 150, 300—e.g., where one of methods 20, 500 includes or is otherwise based on such communication.

As shown in FIG. 6B, information 640 comprises data 645 and tag information 650 for data 645. For example, chunks 641, 642, 643, 644 of data 645 include respective data objects d0, d1, d2, d3, wherein tag information 650 comprises tags 646-649 which correspond to chunks 641-644 (respectively). In this example scenario, data objects d0, d1, d2, d3 are of various respective information classes—e.g., wherein objects d0, d2 are each of a class which is identified by a tag value t0, object d1 is of a class which is identified by a tag value t1, and object d3 is of a class which is identified by a tag value t3

As with the scenario described with respect to FIG. 6A, in some embodiments, the tag value t0 is provided by the processor as reference for the memory controller to evaluate tags 646-649. In various embodiments, the memory controller generates information 660 (or alternatively, information 680) based on data 645 and further based on an evaluation as to whether any of tags 646-649 include data which is of the information class indicated by reference tag value t0.

In one example scenario, data 665 of information 660 comprises chunks 661, 662, 663, 664 (based on chunks 641-644, respectively) which similarly include respective data objects d0, d1, d2, d3. Due to a mismatch between the reference tag value t0 and at least some of tags 646-649, information 660 further comprises a flag field 675, the value (c1) of which indicates that data 665 is flagged (and does not qualify to be cached at the processor). Although some embodiments are not limited in this regard, information 660 further comprises a tag field 670 which has some null value, default value, or other indicator that not all of chunks 661-664 store objects which correspond to the reference tag value t0

In an alternative example scenario, data 685 of information 680 comprises chunks 681, 682, 683, 684 (at least some of which are based on chunks 641-644). For example, due to a mismatch between the reference tag value t0 and at least some of tags 646-649, data 685 includes only those data objects d0, d2 of data objects d0-d3 which correspond to value t0. In one such embodiment, information 680 further comprises one tag 690 to identify the tag value t0 for all of data 685. Additionally or alternatively, information 680 further comprises a flag field 695, the value (c0) of which indicates that data 685 is not flagged (and qualifies to be cached at the processor). In one such embodiment, information 680 omits tag 690—e.g., wherein the processor itself (in the absence of the memory controller indicating to the contrary with, for example, flag field 695) automatically associates the tag value t0 with any chunks provided in the response to the memory access request.

Techniques and architectures for supporting memory tagging are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 790 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 8A:
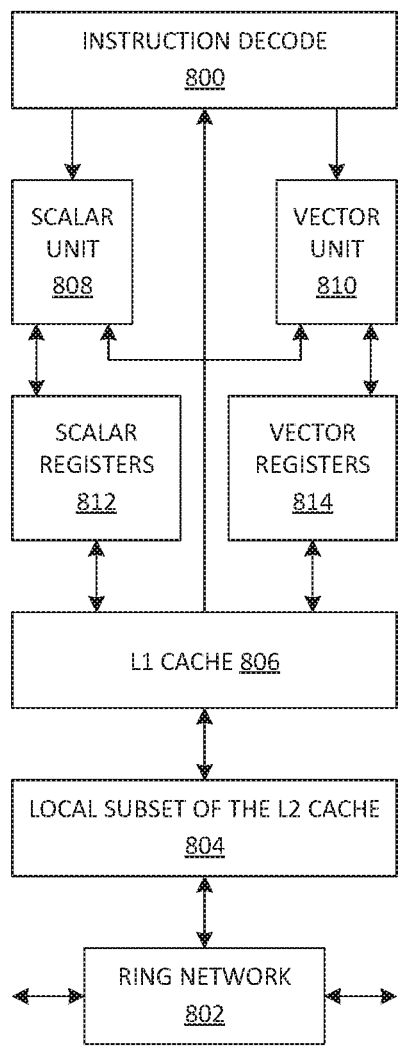
FIGS. 8A-B illustrate a block diagram of a more specific exemplary in-order core architecture, which core would be one of several logic blocks (including other cores of the same type and/or different types) in a chip.
Figure 8B:
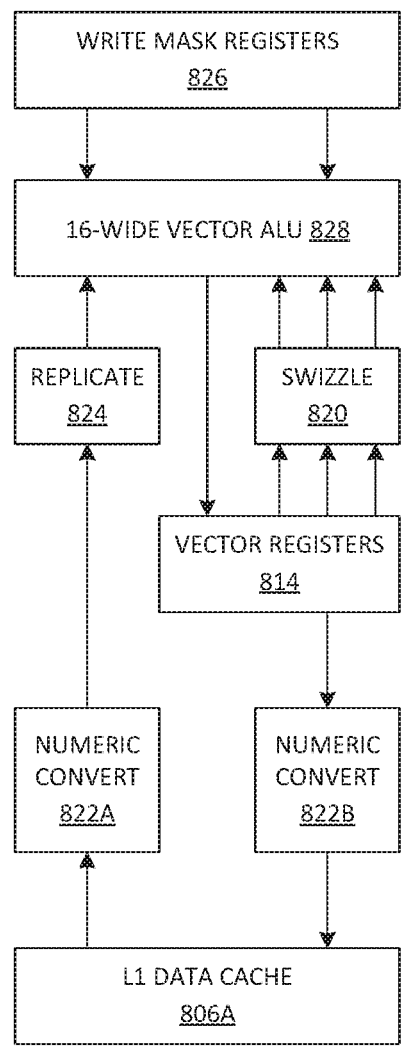

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1

(L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 806, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Figure 9:
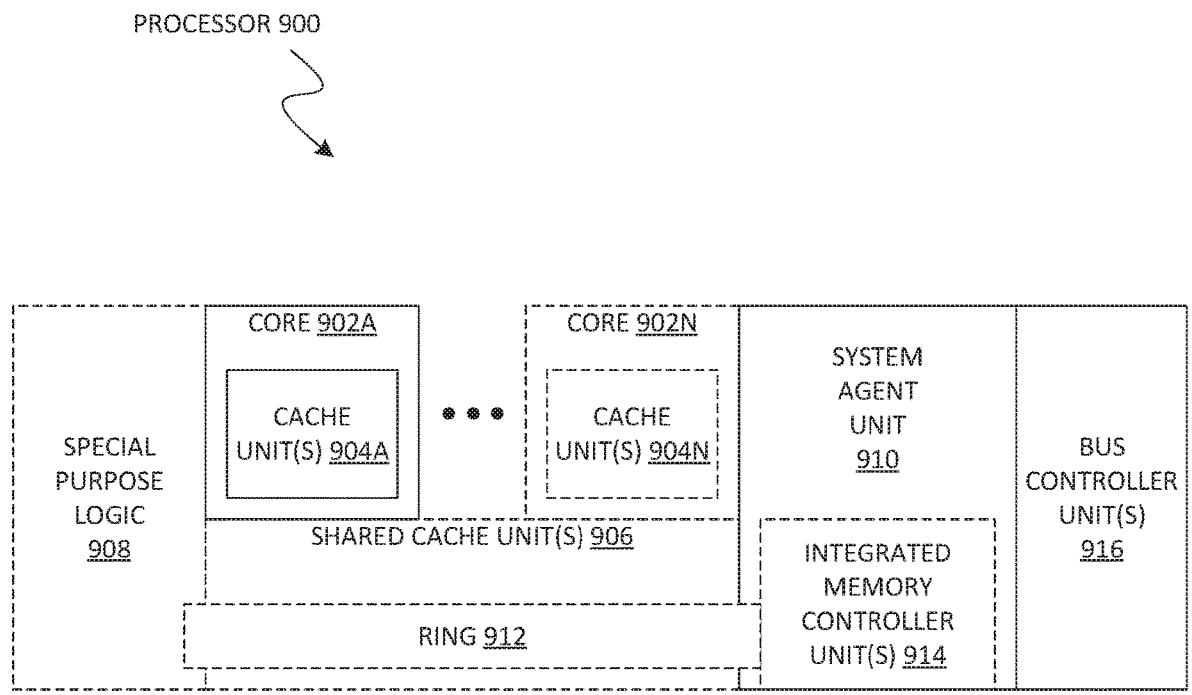
FIG. 9 is a block diagram of a processor that may have more than one core, may have an integrated memory controller, and may have integrated graphics according to embodiments of the invention.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes respective one or more levels of caches 904A-N within cores 902A-N, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
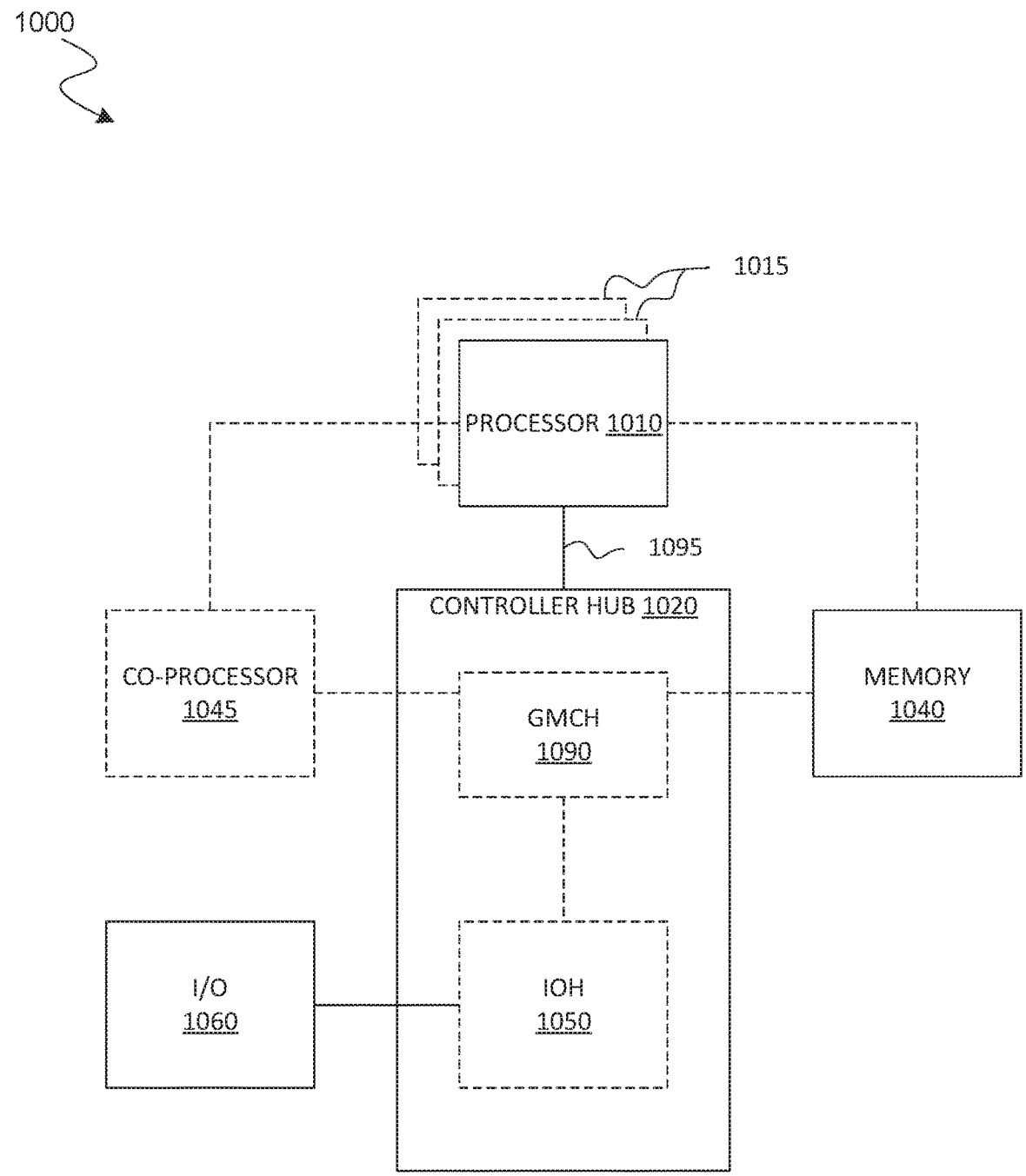
FIGS. 10-13 are block diagrams of exemplary computer architectures.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the processors 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
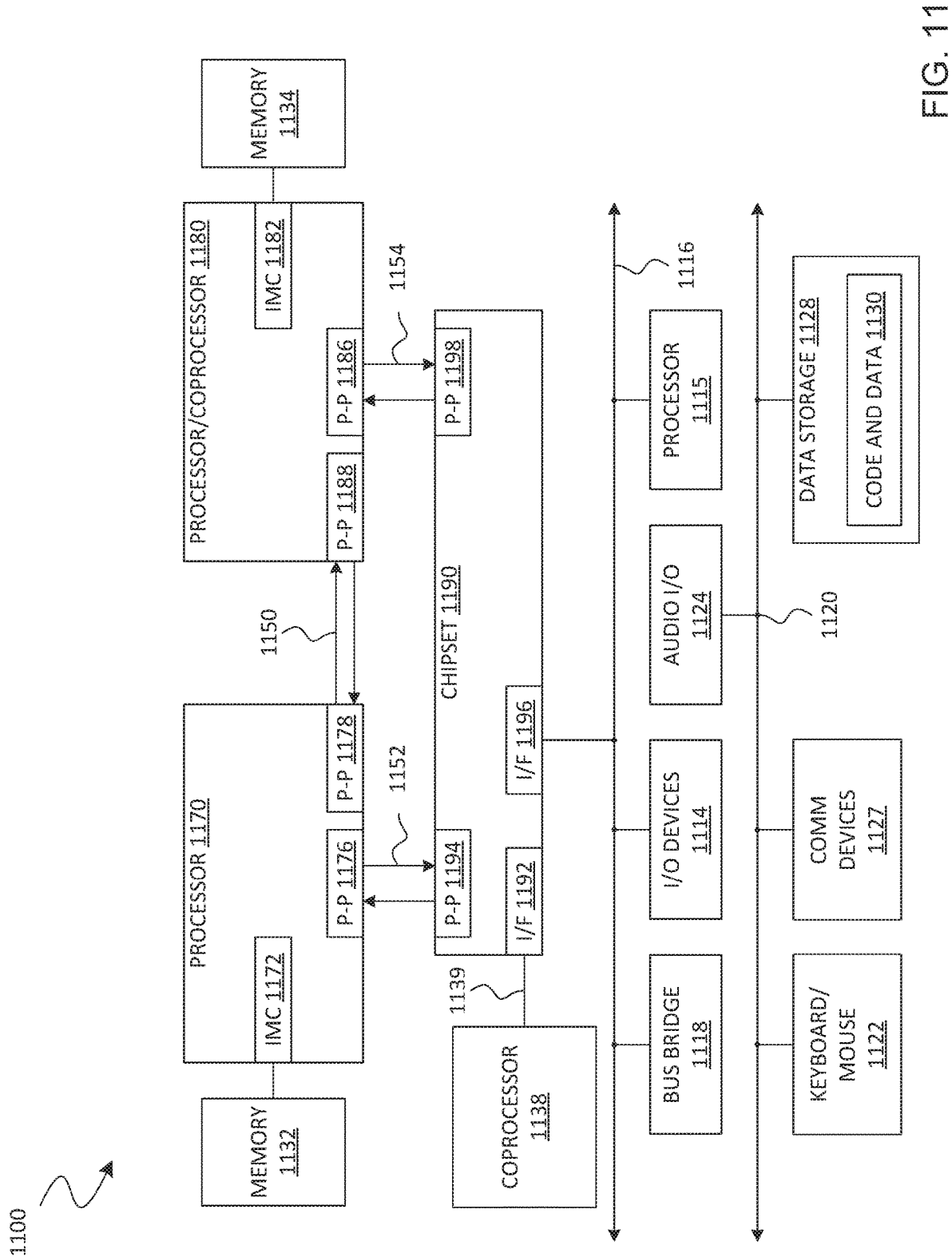

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller unit's point-to-point (P-P) interfaces 1176 and 1178; similarly, second processor 1180 includes P-P interfaces 1186 and 1188. Processors 1170, 1180 may exchange information via a point-to-point (P-P) interconnect 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1192 and an interconnect 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
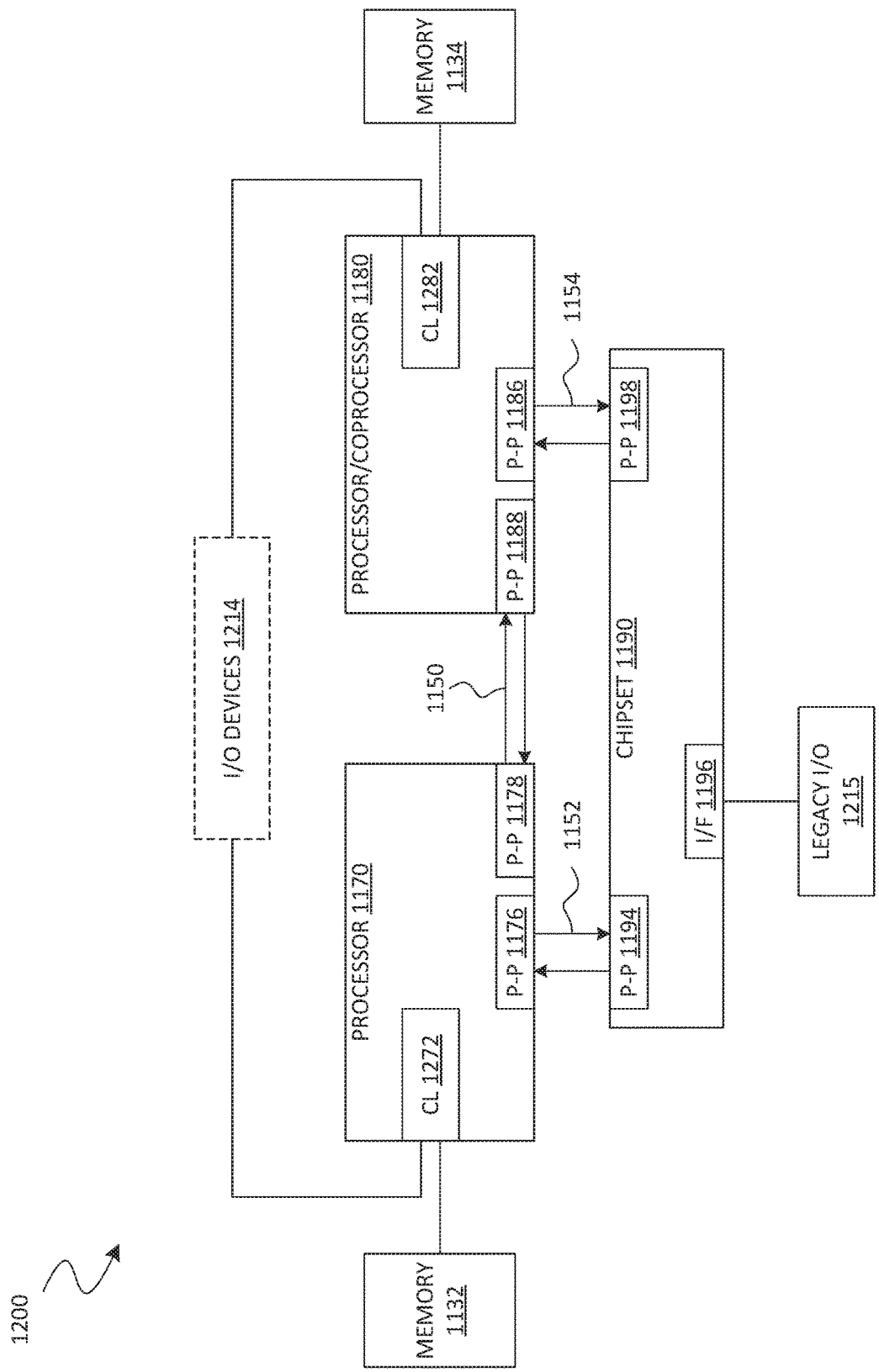

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1272 and 1282, respectively. Thus, the CL 1272, 1282 include integrated memory controller units and include I/O control logic. FIG. 12 illustrates that not only are the memories 1132, 1134 coupled to the CL 1272, 1282, but also that I/O devices 1214 are also coupled to the control logic 1272, 1282. Legacy I/O devices 1215 are coupled to the chipset 1190.

Figure 13:
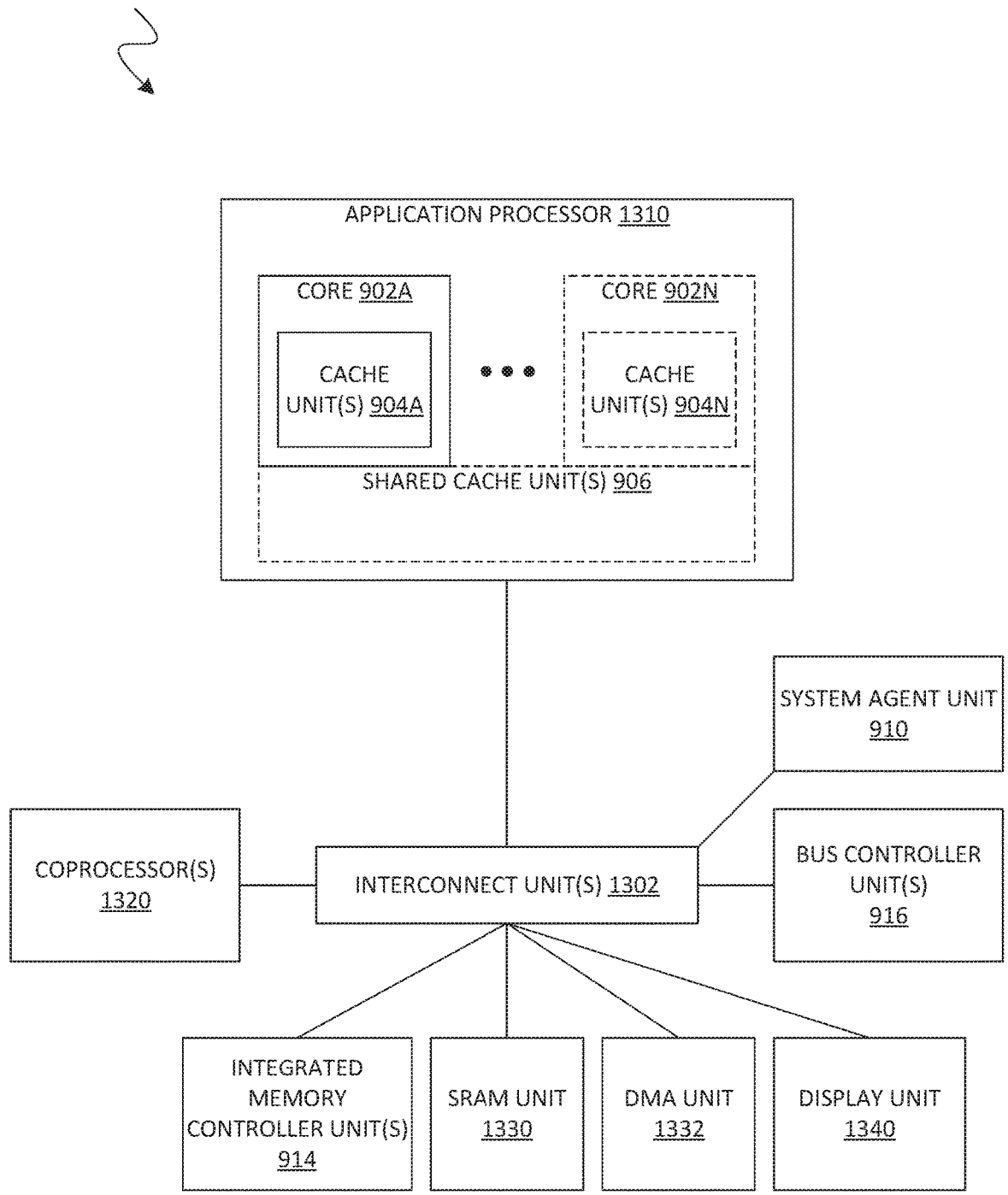

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 902A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 14:
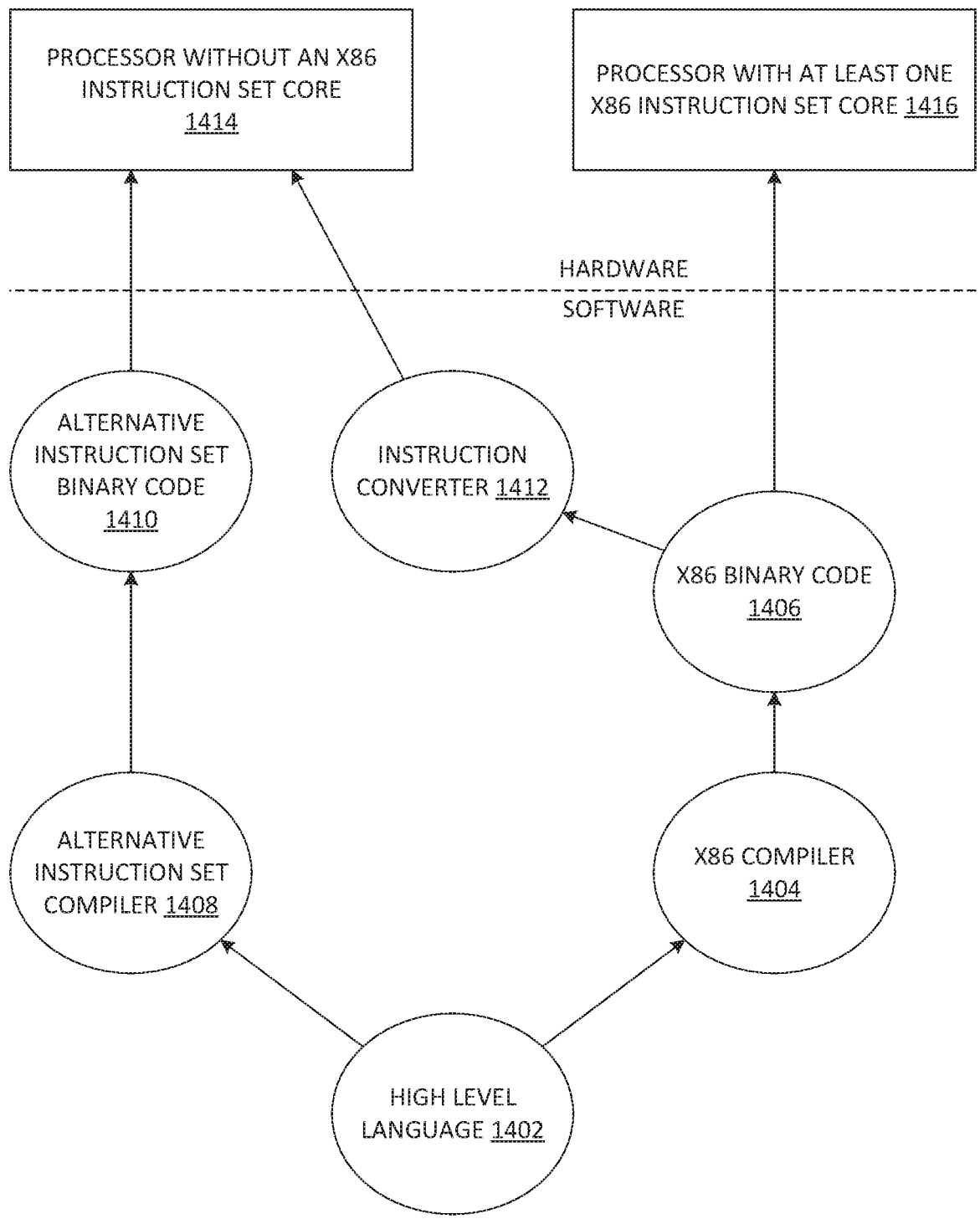
FIG. 14 is a block diagram contrasting the use of a software instruction converter to convert binary instructions in a source instruction set to binary instructions in a target instruction set according to embodiments of the invention.

FIG. 14 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 14 shows a program in a high level language 1402 may be compiled using an x86 compiler 1404 to generate x86 binary code 1406 that may be natively executed by a processor with at least one x86 instruction set core 1416. The processor with at least one x86 instruction set core 1416 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1404 represents a compiler that is operable to generate x86 binary code 1406 (e.g., object code) that can, with or without additional linkage processing, be executed on the processor with at least one x86 instruction set core 1416. Similarly, FIG. 14 shows the program in the high level language 1402 may be compiled using an alternative instruction set compiler 1408 to generate alternative instruction set binary code 1410 that may be natively executed by a processor without at least one x86 instruction set core 1414 (e.g., a processor with cores that execute the MIPS instruction set of MIPS Technologies of Sunnyvale, CA and/or that execute the ARM instruction set of ARM Holdings of Sunnyvale, CA). The instruction converter 1412 is used to convert the x86 binary code 1406 into code that may be natively executed by the processor without an x86 instruction set core 1414. This converted code is not likely to be the same as the alternative instruction set binary code 1410 because an instruction converter capable of this is difficult to make; however, the converted code will accomplish the general operation and be made up of instructions from the alternative instruction set. Thus, the instruction converter 1412 represents software, firmware, hardware, or a combination thereof that, through emulation, simulation or any other process, allows a processor or other electronic device that does not have an x86 instruction set processor or core to execute the x86 binary code 1406.

In one or more first embodiments, a memory controller comprises protocol circuitry to receive a request from a processor and, based on the request, to read data from an addressable location of a memory device, wherein the data comprises multiple chunks, and wherein the protocol circuitry is further to send one or more chunks of the multiple chunks to the processor in a response to the request, tag identification circuitry, coupled to the protocol circuitry, to determine first tag information which corresponds to the data, wherein the first tag information provides a first granularity at which the multiple chunks each correspond to a respective tag, and tag evaluation circuitry, coupled to the tag identification circuitry, to detect a match between at least two tags based on the first tag information, wherein, based on the match, the protocol circuitry is to indicate to the processor that second tag information corresponds to the one or more chunks, wherein the second tag information provides a second granularity at which the one or more chunks each correspond to a respective tag, wherein the first granularity is more than the second granularity.

In one or more second embodiments, further to the first embodiment, the tag evaluation circuitry to detect the match comprises the tag evaluation circuitry to perform a first evaluation to determine that a first tag, provided to the memory controller by the processor, is equal to a second tag of the first tag information.

In one or more third embodiments, further to the second embodiment, the tag evaluation circuitry to detect the match further comprises the tag evaluation circuitry to perform a second evaluation, based on the first evaluation, to determine whether all other tags of the first tag information each match the first tag.

In one or more fourth embodiments, further to the first embodiment or the second embodiment, the response omits one or more other chunks of the multiple chunks.

In one or more fifth embodiments, further to the first embodiment or the second embodiment, the request is a first request, the addressable location is a first addressable location, the data is first data, and the multiple chunks are a first multiple chunks, wherein the protocol circuitry is further to read second data from a second addressable location of the memory device based on a second request from the processor, wherein the second data comprises a second multiple chunks, the tag identification circuitry is further to determine third tag information which corresponds to the second data, the tag evaluation circuitry is further to detect a mismatch between a first tag provided by the processor and a second tag of the third tag information, and the protocol circuitry is further to send to the processor a second response to the second request, wherein the second response comprises a second one or more chunks of the second multiple chunks, wherein based on the mismatch, the second response further comprises an indication that the processor is to forego a write of the second one or more chunks to a cache of the processor.

In one or more sixth embodiments, further to the fifth embodiment, the second request is on behalf of a process executed with a core of the processor, wherein the core comprises the cache.

In one or more seventh embodiments, further to the sixth embodiment, the cache is a L1 cache of the core, wherein the indication is further to prevent a write of the one or more chunks to another cache of the processor.

In one or more eighth embodiments, further to the seventh embodiment, the other cache is a L2 cache of the core.

In one or more ninth embodiments, further to the seventh embodiment, the other cache is shared by the core and another core of the processor.

In one or more tenth embodiments, a method at a memory controller comprises, based on a request from a processor, reading data from an addressable location of a memory device, the data comprising multiple chunks, and determining first tag information which corresponds to the data, wherein the first tag information provides a first granularity at which the multiple chunks each correspond to a respective tag. The method further comprises detecting a match between at least two tags based on the first tag information, sending to the processor one or more chunks of the multiple chunks in a response to the request, and based on the match, indicating to the processor that second tag information corresponds to the one or more chunks, wherein the second tag information provides a second granularity at which the one or more chunks each correspond to a respective tag, wherein the first granularity is more than the second granularity.

In one or more eleventh embodiments, further to the tenth embodiment, detecting the match comprises performing a first evaluation to determine that a first tag, provided to the memory controller by the processor, is equal to a second tag of the first tag information.

In one or more twelfth embodiments, further to the eleventh embodiment, detecting the match further comprises, based on the first evaluation, performing a second evaluation to determine whether all other tags of the first tag information each match the first tag.

In one or more thirteenth embodiments, further to the tenth embodiment or the eleventh embodiment, the response omits one or more other chunks of the multiple chunks.

In one or more fourteenth embodiments, further to the tenth embodiment or the eleventh embodiment, the request is a first request, the addressable location is a first addressable location, the data is first data, and the multiple chunks are a first multiple chunks, the method further comprises, based on a second request from the processor, reading second data from a second addressable location of the memory device, the second data comprising a second multiple chunks, and determining third tag information which corresponds to the second data. The method further comprises detecting a mismatch between a first tag provided by the processor and a second tag of the third tag information, and sending to the processor a second response to the second request, the second response comprising one or more chunks of the second multiple chunks, wherein based on the mismatch, the second response further comprises an indication that the processor is to forego a write of the one or more chunks to a cache of the processor.

In one or more fifteenth embodiments, further to the fourteenth embodiment, the second request is on behalf of a process executed with a core of the processor, wherein the core comprises the cache.

In one or more sixteenth embodiments, further to the fifteenth embodiment, the cache is a L1 cache of the core, wherein the indication is further to prevent a write of the one or more chunks to another cache of the processor.

In one or more seventeenth embodiments, further to the sixteenth embodiment, the other cache is a L2 cache of the core.

In one or more eighteenth embodiments, further to the sixteenth embodiment, the other cache is shared by the core and another core of the processor.

In one or more nineteenth embodiments, a system comprises a processor, a memory device, and a memory controller coupled to the processor and the memory device. The memory controller comprises protocol circuitry to receive a request from the processor and, based on the request, to read data from an addressable location of the memory device, wherein the data comprises multiple chunks, and wherein the protocol circuitry is further to send one or more chunks of the multiple chunks to the processor in a response to the request, tag identification circuitry, coupled to the protocol circuitry, to determine first tag information which corresponds to the data, wherein the first tag information provides a first granularity at which the multiple chunks each correspond to a respective tag, and tag evaluation circuitry, coupled to the tag identification circuitry, to detect a match between at least two tags based on the first tag information, wherein, based on the match, the protocol circuitry is to indicate to the processor that second tag information corresponds to the one or more chunks, wherein the second tag information provides a second granularity at which the one or more chunks each correspond to a respective tag, wherein the first granularity is more than the second granularity. The system further comprises a display device coupled to the processor, the display device to display an image based on the one or more chunks.

In one or more twentieth embodiments, further to the nineteenth embodiment, the tag evaluation circuitry to detect the match comprises the tag evaluation circuitry to perform a first evaluation to determine that a first tag, provided to the memory controller by the processor, is equal to a second tag of the first tag information.

In one or more twenty-first embodiments, further to the twentieth embodiment, the tag evaluation circuitry to detect the match further comprises the tag evaluation circuitry to perform a second evaluation, based on the first evaluation, to determine whether all other tags of the first tag information each match the first tag.

In one or more twenty-second embodiments, further to the nineteenth embodiment or the twentieth embodiment, the response omits one or more other chunks of the multiple chunks.

In one or more twenty-third embodiments, further to the nineteenth embodiment or the twentieth embodiment, the request is a first request, the addressable location is a first addressable location, the data is first data, and the multiple chunks are a first multiple chunks, wherein the protocol circuitry is further to read second data from a second addressable location of the memory device based on a second request from the processor, wherein the second data comprises a second multiple chunks, the tag identification circuitry is further to determine third tag information which corresponds to the second data, the tag evaluation circuitry is further to detect a mismatch between a first tag provided by the processor and a second tag of the third tag information, and the protocol circuitry is further to send to the processor a second response to the second request, wherein the second response comprises a second one or more chunks of the second multiple chunks, wherein based on the mismatch, the second response further comprises an indication that the processor is to forego a write of the second one or more chunks to a cache of the processor.

In one or more twenty-fourth embodiments, further to the twenty-third embodiment, the second request is on behalf of a process executed with a core of the processor, wherein the core comprises the cache.

In one or more twenty-fifth embodiments, further to the twenty-fourth embodiment, the cache is a L1 cache of the core, wherein the indication is further to prevent a write of the one or more chunks to another cache of the processor.

In one or more twenty-sixth embodiments, further to the twenty-fifth embodiment, the other cache is a L2 cache of the core.

In one or more twenty-seventh embodiments, further to the twenty-fifth embodiment, the other cache is shared by the core and another core of the processor.

What is claimed is:

1. A memory controller comprising:
   protocol circuitry to receive a request from a processor and, based on the request, to read data from an addressable location of a memory device, wherein the data comprises multiple chunks, and wherein the protocol circuitry is further to send one or more chunks of the multiple chunks to the processor in a response to the request;
   tag identification circuitry, coupled to the protocol circuitry, to determine first tag information which corresponds to the data, wherein the first tag information provides a first granularity at which the multiple chunks each correspond to a respective tag; and
   tag evaluation circuitry, coupled to the tag identification circuitry, to detect a match between at least two tags based on the first tag information;
   wherein, based on the match, the protocol circuitry is to indicate to the processor that second tag information corresponds to the one or more chunks, wherein the second tag information provides a second granularity at which the one or more chunks each correspond to a respective tag, wherein the first granularity is more than the second granularity.

2. The memory controller of claim 1, wherein the tag evaluation circuitry to detect the match comprises the tag evaluation circuitry to perform a first evaluation to determine that a first tag, provided to the memory controller by the processor, is equal to a second tag of the first tag information.

3. The memory controller of claim 2, wherein the tag evaluation circuitry to detect the match further comprises:
   the tag evaluation circuitry to perform a second evaluation, based on the first evaluation, to determine whether all other tags of the first tag information each match the first tag.

4. The memory controller of claim 1, wherein the response omits one or more other chunks of the multiple chunks.

5. The memory controller of claim 1, wherein the request is a first request, the addressable location is a first addressable location, the data is first data, and the multiple chunks are a first multiple chunks, wherein:
   the protocol circuitry is further to read second data from a second addressable location of the memory device based on a second request from the processor, wherein the second data comprises a second multiple chunks;
   the tag identification circuitry is further to determine third tag information which corresponds to the second data;
   the tag evaluation circuitry is further to detect a mismatch between a first tag provided by the processor and a second tag of the third tag information; and
   the protocol circuitry is further to send to the processor a second response to the second request, wherein the second response comprises a second one or more chunks of the second multiple chunks, wherein based on the mismatch, the second response further comprises an indication that the processor is to forego a write of the second one or more chunks to a cache of the processor.

6. The memory controller of claim 5, wherein the second request is on behalf of a process executed with a core of the processor, wherein the core comprises the cache.

7. The memory controller of claim 6, wherein the cache is a L1 cache of the core, wherein the indication is further to prevent a write of the one or more chunks to another cache of the processor.

8. A method at a memory controller, the method comprising:
   based on a request from a processor:
      reading data from an addressable location of a memory device, the data comprising multiple chunks; and
      determining first tag information which corresponds to the data, wherein the first tag information provides a first granularity at which the multiple chunks each correspond to a respective tag;
   detecting a match between at least two tags based on the first tag information;
   sending to the processor one or more chunks of the multiple chunks in a response to the request; and
   based on the match, indicating to the processor that second tag information corresponds to the one or more chunks, wherein the second tag information provides a second granularity at which the one or more chunks each correspond to a respective tag, wherein the first granularity is more than the second granularity.

9. The method of claim 8, wherein detecting the match comprises performing a first evaluation to determine that a first tag, provided to the memory controller by the processor, is equal to a second tag of the first tag information.

10. The method of claim 9, wherein detecting the match further comprises:
based on the first evaluation, performing a second evaluation to determine whether all other tags of the first tag information each match the first tag.

11. The method of claim 8, wherein the response omits one or more other chunks of the multiple chunks.

12. The method of claim 8, wherein the request is a first request, the addressable location is a first addressable location, the data is first data, and the multiple chunks are a first multiple chunks, the method further comprising:
based on a second request from the processor:
reading second data from a second addressable location of the memory device, the second data comprising a second multiple chunks; and
determining third tag information which corresponds to the second data;
detecting a mismatch between a first tag provided by the processor and a second tag of the third tag information; and
sending to the processor a second response to the second request, the second response comprising one or more chunks of the second multiple chunks, wherein based on the mismatch, the second response further comprises an indication that the processor is to forego a write of the one or more chunks to a cache of the processor.

13. The method of claim 12, wherein the second request is on behalf of a process executed with a core of the processor, wherein the core comprises the cache.

14. The method of claim 13, wherein the cache is a L1 cache of the core, wherein the indication is further to prevent a write of the one or more chunks to another cache of the processor.

15. A system comprising:
a processor;
a memory device;
a memory controller coupled to the processor and the memory device, the memory controller comprising:
protocol circuitry to receive a request from the processor and, based on the request, to read data from an addressable location of the memory device, wherein the data comprises multiple chunks, and wherein the protocol circuitry is further to send one or more chunks of the multiple chunks to the processor in a response to the request;
tag identification circuitry, coupled to the protocol circuitry, to determine first tag information which corresponds to the data, wherein the first tag information provides a first granularity at which the multiple chunks each correspond to a respective tag; and
tag evaluation circuitry, coupled to the tag identification circuitry, to detect a match between at least two tags based on the first tag information;
wherein, based on the match, the protocol circuitry is to indicate to the processor that second tag information corresponds to the one or more chunks, wherein the second tag information provides a second granularity at which the one or more chunks each correspond to a respective tag, wherein the first granularity is more than the second granularity; and
a display device coupled to the processor, the display device to display an image based on the one or more chunks.

16. The system of claim 15, wherein the tag evaluation circuitry to detect the match comprises the tag evaluation circuitry to perform a first evaluation to determine that a first tag, provided to the memory controller by the processor, is equal to a second tag of the first tag information.

17. The system of claim 16, wherein the tag evaluation circuitry to detect the match further comprises:
the tag evaluation circuitry to perform a second evaluation, based on the first evaluation, to determine whether all other tags of the first tag information each match the first tag.

18. The system of claim 15, wherein the response omits one or more other chunks of the multiple chunks.

19. The system of claim 15, wherein:
the request is a first request, the addressable location is a first addressable location, the data is first data, and the multiple chunks are a first multiple chunks;
the protocol circuitry is further to read second data from a second addressable location of the memory device based on a second request from the processor, wherein the second data comprises a second multiple chunks;
the tag identification circuitry is further to determine third tag information which corresponds to the second data;
the tag evaluation circuitry is further to detect a mismatch between a first tag provided by the processor and a second tag of the third tag information; and
the protocol circuitry is further to send to the processor a second response to the second request, wherein the second response comprises a second one or more chunks of the second multiple chunks, wherein based on the mismatch, the second response further comprises an indication that the processor is to forego a write of the second one or more chunks to a cache of the processor.

20. The system of claim 19, wherein the second request is on behalf of a process executed with a core of the processor, wherein the core comprises the cache.

* * * * *